(12) United States Patent
Iwata et al.

(10) Patent No.: US 10,459,318 B2
(45) Date of Patent: Oct. 29, 2019

(54) IMAGE DISPLAY APPARATUS METHOD AND STORAGE MEDIUM FOR MODIFYING DISPLAY LUMINANCE

(71) Applicant: CANON KABUSHIKI KAISHA, Tokyo (JP)

(72) Inventors: Takuya Iwata, Kawasaki (JP); Tomokazu Mori, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 1 day.

(21) Appl. No.: 15/477,807

(22) Filed: Apr. 3, 2017

(65) Prior Publication Data
US 2017/0293205 A1 Oct. 12, 2017

(30) Foreign Application Priority Data

Apr. 11, 2016 (JP) .................. 2016-079105

(51) Int. Cl.
| | |
|---|---|
| *H04N 1/00* | (2006.01) |
| *G06T 3/40* | (2006.01) |
| *G03B 17/18* | (2006.01) |
| *G06T 11/00* | (2006.01) |
| *G09G 5/02* | (2006.01) |
| *H04N 1/21* | (2006.01) |
| *H04N 5/232* | (2006.01) |

(52) U.S. Cl.
CPC .............. *G03B 17/18* (2013.01); *G06T 3/40* (2013.01); *G06T 11/001* (2013.01); *G09G 5/02* (2013.01); *H04N 1/00458* (2013.01); *H04N 1/00469* (2013.01); *H04N 1/2116* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 2003/0179219 A1* | 9/2003 | Nakano .................. | G06F 3/0481 345/660 |
| 2004/0239682 A1* | 12/2004 | Breunig .................... | G09G 3/36 345/602 |
| 2005/0140829 A1* | 6/2005 | Uchida ................... | H04N 5/142 348/625 |
| 2006/0038807 A1* | 2/2006 | Eckhardt ................ | H04N 1/407 345/207 |
| 2008/0309811 A1* | 12/2008 | Fujinawa .............. | G02F 1/1347 348/333.01 |

(Continued)

FOREIGN PATENT DOCUMENTS

| | | |
|---|---|---|
| CN | 1750091 A | 3/2006 |
| CN | 101197957 A | 6/2008 |

(Continued)

*Primary Examiner* — Diane M Wills
(74) *Attorney, Agent, or Firm* — Canon U.S.A., Inc. IP Division

(57) ABSTRACT

An image display apparatus includes an image acquisition unit configured to acquire an input image to be displayed on a display unit and a display control unit configured to reduce display luminance of the display unit in a case where a display image obtained by enlarging the input image is displayed on the display unit or in a case where a display image obtained by enhancing a contour of an object in the input image is displayed on the display unit.

12 Claims, 23 Drawing Sheets

(56) References Cited

U.S. PATENT DOCUMENTS

| | | | |
|---|---|---|---|
| 2010/0026736 A1* | 2/2010 | Plut | G09G 5/00 |
| | | | 345/690 |
| 2013/0194479 A1* | 8/2013 | Jogetsu | G03B 13/04 |
| | | | 348/333.08 |
| 2014/0078166 A1* | 3/2014 | Barnhoefer | G09G 3/3406 |
| | | | 345/589 |
| 2017/0140734 A1* | 5/2017 | Kageyama | G09G 5/10 |

FOREIGN PATENT DOCUMENTS

| | | |
|---|---|---|
| CN | 101206827 A | 6/2008 |
| CN | 102087814 A | 6/2011 |
| CN | 102750929 A | 10/2012 |
| CN | 105144689 A | 12/2015 |
| JP | 2006-317577 A | 11/2006 |
| WO | 2016/017081 A1 | 2/2016 |

\* cited by examiner

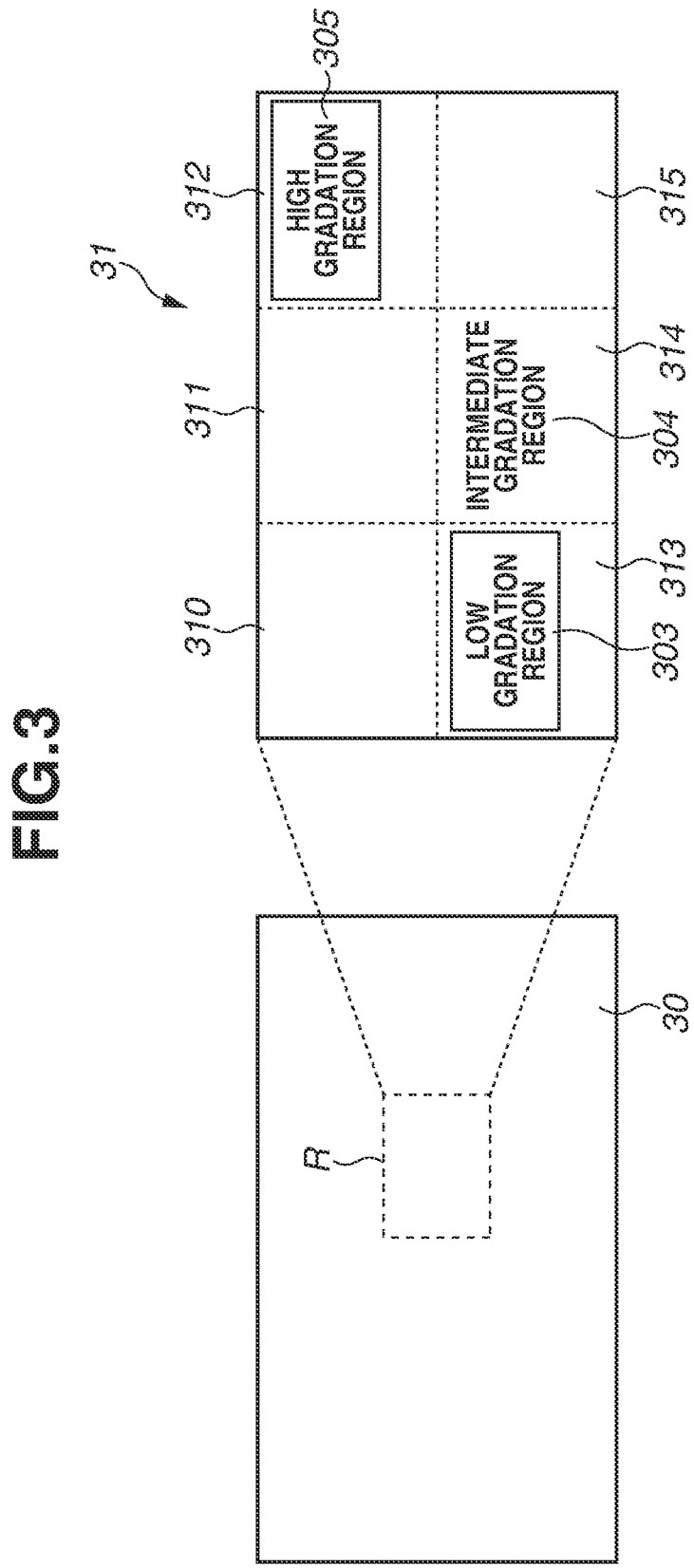

FIG.18

| | FRAME 601 | FRAME 602 | FRAME 603 | FRAME 604 |
|---|---|---|---|---|
| MAIN STREAM | EMISSION RATIO A = 80 | EMISSION RATIO A = 100 | EMISSION RATIO A = 100 | EMISSION RATIO A = 80 |
| | EMISSION RATIO B = (80,100,80,80) | EMISSION RATIO B = (100,100,80,80) | EMISSION RATIO B = (100,100,80,80) | EMISSION RATIO B = (80,100,80,80) |
| | EMISSION RATIO C = (80,80,100,80,80,80) | EMISSION RATIO C = (90,100,100,80,80,80) | EMISSION RATIO C = (90,100,100,80,80,80) | EMISSION RATIO C = (80,90,100,80,80,80) |
| SUB STREAM | NUMBER OF DIVISIONS 2 × 2 ⇒ EMISSION RATIO B | NUMBER OF DIVISIONS 2 × 2 ⇒ EMISSION RATIO B | NUMBER OF DIVISIONS 2 × 2 ⇒ EMISSION RATIO B | NUMBER OF DIVISIONS 2 × 2 ⇒ EMISSION RATIO B |
| | NUMBER OF DIVISIONS 2 × 3 ⇒ EMISSION RATIO C | NUMBER OF DIVISIONS 2 × 3 ⇒ EMISSION RATIO C | NUMBER OF DIVISIONS 2 × 3 ⇒ EMISSION RATIO C | NUMBER OF DIVISIONS 2 × 3 ⇒ EMISSION RATIO C |
| | OTHERS ⇒ EMISSION RATIO A | OTHERS ⇒ EMISSION RATIO A | OTHERS ⇒ EMISSION RATIO A | OTHERS ⇒ EMISSION RATIO A |
| | GAMMA = 2.2 | GAMMA = 2.2 | GAMMA = 1.8 | GAMMA = 1.8 |

181 (main stream emission ratios), 182 (sub stream)

TIME →

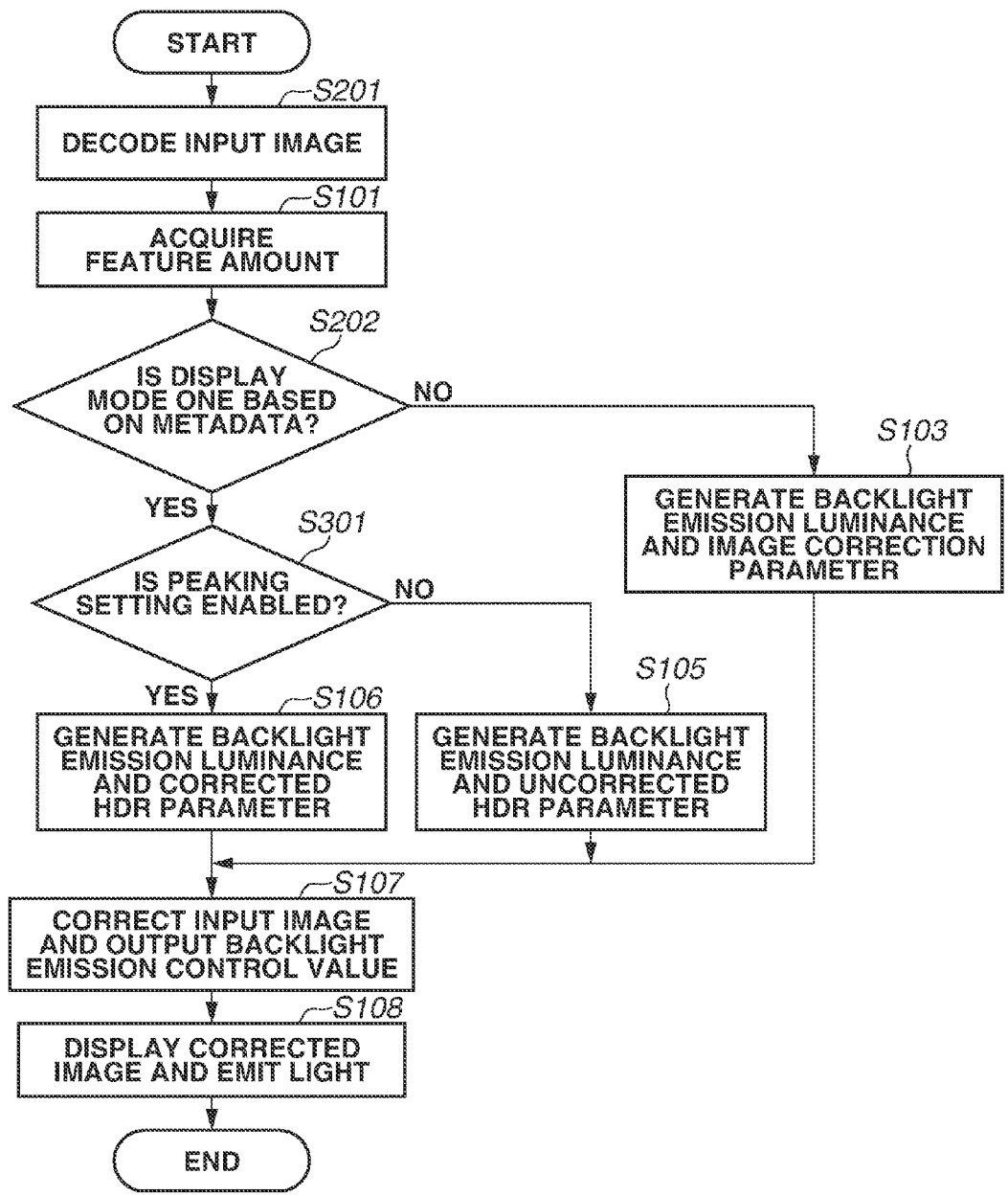

IMAGE DISPLAY APPARATUS METHOD AND STORAGE MEDIUM FOR MODIFYING DISPLAY LUMINANCE

BACKGROUND

Technical Field

The present invention relates to an image display apparatus for displaying an image, an image display method, and a storage medium.

Description of the Related Art

Image display apparatuses that can control luminance of a backlight in each of image display modes have conventionally been known. Japanese Patent Application Laid-Open No. 2006-317577 discusses an image display apparatus that can increase luminance of a backlight for a region subjected to a focus adjustment, compared to those of other regions.

Image display apparatuses having an enlargement display mode and an edge peaking image mode for facilitating a focus adjustment have been known. In the enlargement display mode, a display image targeted for a focus adjustment is enlarged and displayed. In the edge peaking image mode, an edge peaking image for enhancing contours in the display image is displayed in a superimposed manner. In such image display apparatuses, if luminance of a backlight in a region subjected to a focus adjustment is increased with the display image enlarged and displayed, a user has difficulty in performing a focus adjustment since the light from the backlight is too bright, which is problematic. If the luminance of the backlight in the region subjected to a focus adjustment is increased with an edge peaking image displayed, the edge peaking image becomes less visible and thus a user has difficulty in performing a focus adjustment, which is also problematic.

SUMMARY OF THE INVENTION

According to an aspect of the present invention, an image display apparatus includes a display unit configured to display an image thereon, an image acquisition unit configured to acquire an input image to be displayed on the display unit, and a display control unit configured to reduce display luminance of the display unit in a case where a display image obtained by enlarging the input image is displayed on the display unit or in a case where a display image obtained by enhancing a contour of an object in the input image is displayed on the display unit.

According to another aspect of the present invention, an image display method executed by a computer includes acquiring an input image to be displayed on a display unit configured to display an image thereon, and reducing display luminance of the display unit in a case where a display image obtained by enlarging the input image is displayed on the display unit or in a case where a display image obtained by enhancing a contour of an object in the input image is displayed on the display unit.

Further features of the present invention will become apparent from the following description of exemplary embodiments with reference to the attached drawings.

BRIEF DESCRIPTION OF THE DRAWINGS

FIG. 3 is a diagram illustrating an example of an input image for describing an operation in each display mode.

FIG. 18 is a diagram illustrating another example of display luminance information that can be extracted from an encoded image.

FIG. 23 is a flowchart illustrating an example of an operation of the image display apparatus according to the fourth exemplary embodiment.

DESCRIPTION OF THE EMBODIMENTS

Figure 1:
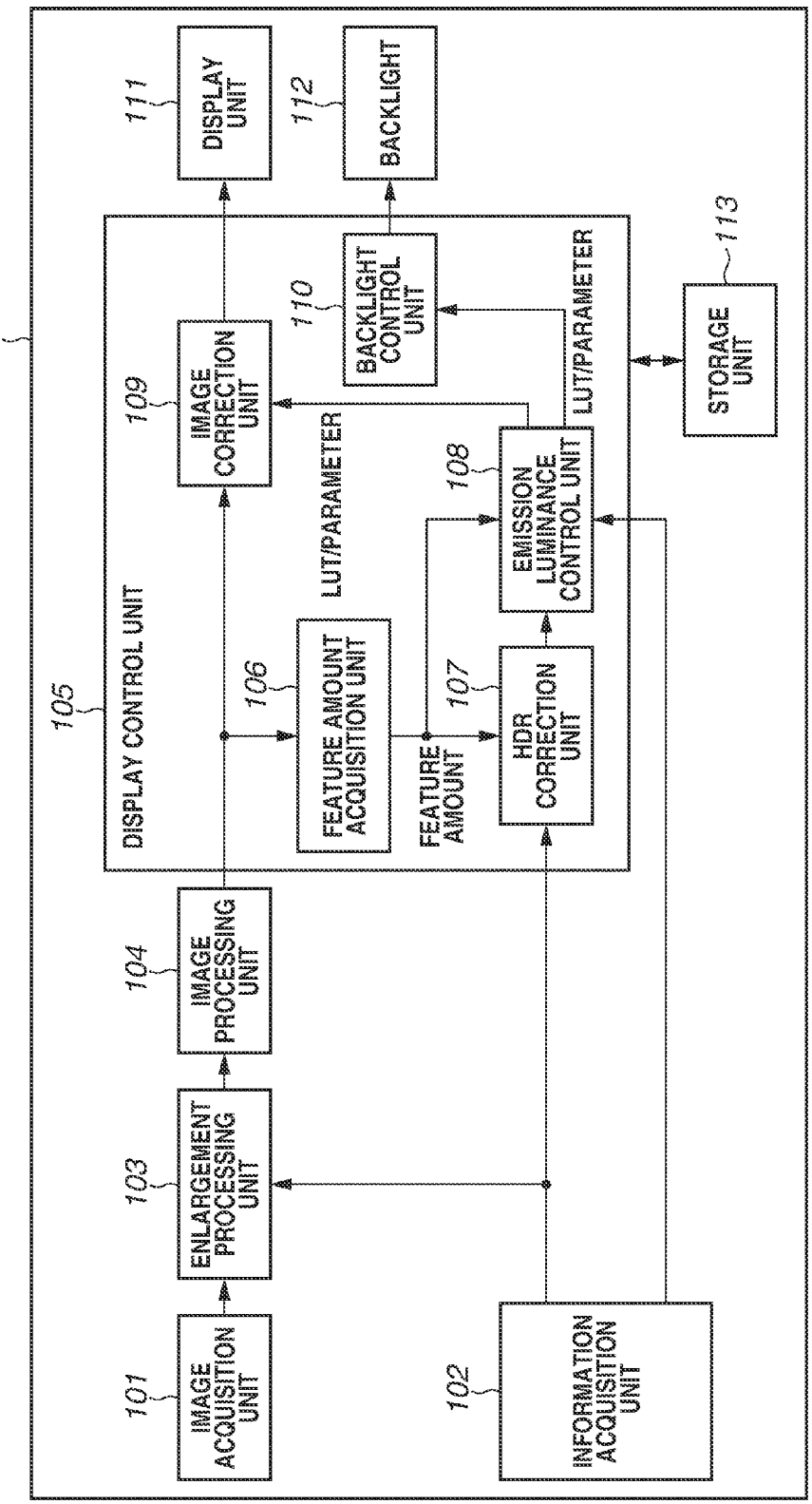
FIG. 1 is a block diagram illustrating a configuration of an image display apparatus according to a first exemplary embodiment.

In the field of making a movie or a television program, a person who captures image (hereinafter, referred to as a user) displays a captured image (including moving images and still images) on a display having a display screen larger than that of a camera viewfinder and checks a focus on the display screen so as to facilitate a focus check operation on the captured image. To assist the user's focus check operation, such a display sometimes has a function of enlarging and displaying a part of a display image and/or a function of displaying an edge peaking image for enhancing contour lines of an object in the display image in a superimposed manner.

Examples of a method for enlarging a display image include an interpolation enlargement method and a pixel enlargement method. The interpolation enlargement method is a method for generating an enlarged image by performing interpolation calculation on a plurality of adjacent pieces of pixel data if a pixel needs to be interpolated for enlargement. The pixel enlargement method is a method for generating an enlarged image by duplicating an adjacent piece of pixel data if a pixel needs to be interpolated for enlargement. The pixel enlargement method is used to not produce differences between the image captured by the camera and the image displayed on the display if the image is enlarged and displayed during a focus adjustment.

As the dynamic range of an image sensor is getting wider and a technique for superimposing a plurality of images captured at different exposures improves in recent years, high dynamic range (HDR) image capturing is becoming common. With the sophistication of emission luminance control of a backlight of a display and image processing, a technique for providing display (hereinafter, referred to as HDR display) with a contrast ratio and emission luminance higher than those of a conventional display has been discussed. If an image display apparatus provides such HDR display, the brightness of an object can be more faithfully expressed. This enables display with higher presence than heretofore.

While the image display apparatus enlarges and displays a display image to assist a focus check operation, the user is likely to look closely at details of the region displayed with pixel enlargement longer than in normal viewing. HDR display with high luminance can therefore make a focus check difficult. For example, if a region targeted for pixel enlargement includes a region of high luminance (for example, several thousands of $cd/m^2$ or higher) and such a region is simply enlarged and displayed with the high luminance, the user is likely to have difficulty in performing a focus check due to glare. If the user looks closely at or near the region of high luminance, the efficiency of the focus check operation may decrease. If an edge peaking image is superimposed on the display image and the luminance of a region other than the edge peaking image is high, the edge peaking image can be difficult to be identified.

If a bright object suddenly comes into the region under pixel enlargement, the emission luminance of the region at which the user is looking closely increases sharply. As a result, the human eyes may fail to adapt quickly enough and a focus check may become difficult. On the contrary, if the pixel enlargement region has low luminance (for example, 1 $cd/m^2$ or lower), too low luminance of the portion where the contour of the object lies can make a focus check difficult.

To solve such problems, an image display apparatus according to an exemplary embodiment makes display luminance lower than in other display states to facilitate the user's focus check or adjustment operation if part of a display image is enlarged and displayed or if an edge peaking image is superimposed. As employed herein, the display luminance refers to the magnitude of luminance that the user visually perceives in a state in which the image is displayed.

Various exemplary embodiments, features, and aspects of the invention will be described in detail below with reference to the drawings.

[Configuration of Image Display Apparatus 100]

FIG. 1 is a block diagram illustrating a configuration of an image display apparatus 100 according to a first exemplary embodiment. The image display apparatus 100 includes an image acquisition unit 101, and information acquisition unit 102, an enlargement processing unit 103, an image processing unit 104, a display control unit 105, a display unit 111, a backlight 112, and a storage unit 113. The display control unit 105 includes a feature amount acquisition unit 106, an HDR correction unit 107, an emission luminance control unit 108, an image correction unit 109, and a backlight control unit 110.

The image acquisition unit 101 acquires input image data to be displayed on the display unit 111, and outputs the acquired input image data to the enlargement processing unit 103. The image acquisition unit 101 may acquire the input image data from an electronic device such as a camera connected to the image display apparatus 100, or from the storage unit 113.

The information acquisition unit 102 acquires instruction information from the user via a user interface such as a remote controller, a touch panel, and a cursor. For example, the information acquisition unit 102 according to the present exemplary embodiment acquires enlargement mode instruction information for setting a mode in which an image to be displayed on the display unit 111 is enlarged. The enlargement mode instruction information includes information indicating a type of enlargement mode (for example, an interpolation enlargement mode or a pixel enlargement mode). The information acquisition unit 102 converts the enlargement mode instruction information into enlargement mode control information, and outputs the enlargement mode control information to the enlargement processing unit 103 and the HDR correction unit 107.

The information acquisition unit 102 may acquire the instruction information by means other than a user interface. For example, if metadata specifying an enlargement mode is added to the input image data, the information acquisition unit 102 can acquire the metadata as enlargement mode instruction information and generate enlargement mode control information.

The information acquisition unit 102 acquires display mode instruction information for selecting a mode in which an image is displayed on the display unit 111. The information acquisition unit 102 converts the display mode instruction information into display mode control information, and outputs the display mode control information to the emission luminance control unit 108. Possible display modes include a normal display mode and an HDR display mode. The HDR display mode is one in which an image is displayed with a higher maximum emission luminance, a lower minimum emission luminance, or a higher contrast ratio than in the normal display mode. As employed herein, the emission luminance refers to that of the backlight 112. The emission luminance may be referred to as backlight emission luminance.

The enlargement processing unit 103 performs enlargement processing on the input image data input from the image acquisition unit 101 based on the enlargement mode control information, and outputs the resulting enlarged image data to the image processing unit 104. If no enlargement mode control information is input, the enlargement processing unit 103 directly outputs the input image data to the image processing unit 104.

The enlargement processing unit 103 performs interpolation enlargement processing or pixel enlargement processing based on the information indicating the type of enlargement mode, included in the enlargement mode control information. Instead of outputting only the enlarged image data, the enlargement processing unit 103 may generate and output mixed image data which includes the input image data and the enlarged image data superimposed thereon. The enlargement processing unit 103 may separately output the enlarged image data and the input image data.

The image processing unit 104 applies image processing to the image data input from the enlargement processing unit 103. Examples of the image processing include color conversion processing, gradation conversion processing, and frame rate conversion processing. The processing of the enlargement processing unit 103 and that of the image processing unit 104 may be performed in arbitrary order. For example, the image processing unit 104 may perform the image processing to the image data output from the image acquisition unit 101, and the enlargement processing unit 103 may enlarge the image data to which the image processing is applied by the image processing unit 104.

The display control unit 105 will be described. The display control unit 105 reduces the display luminance of the display unit 111 if the display unit 111 displays a display image obtained by enlarging an input image. For example, the display control unit 105 switches the display luminance of the display unit 111 in a state in which the display image is displayed on the display unit 111, based on whether the information acquisition unit 102 acquires enlargement information. More specifically, if the input image is displayed on the display unit 111 without being enlarged, the display control unit 105 displays the display image with first display luminance. If the input image is enlarged and displayed on the display unit 111 based on enlargement information, the display control unit 105 displays the display image with second display luminance lower than the first display luminance.

The display control unit 105 may switch the display luminance depending on the enlargement mode. For example, if an instruction for the interpolation enlargement mode (first enlargement mode instruction) is received, the display control unit 105 displays the display image with the first display luminance. If an instruction for the pixel enlargement mode (second enlargement mode instruction) is received, the display control unit 105 displays the display image with the second display luminance.

The display control unit 105 can switch the display luminance by changing gradation values of the input image or by changing the emission luminance of the backlight 112. The display control unit 105 may change the gradation values of the input image and change the emission luminance of the backlight 112. For example, the display control unit 105 can switch the display luminance by changing the gradation values of the input image based on the emission luminance.

For example, a central processing unit (CPU) executes programs stored in the storage unit 113, whereby the display control unit 105 functions as the feature amount acquisition unit 106, the HDR correction unit 107, the emission luminance control unit 108, the image correction unit 109, and the backlight control unit 110.

The feature amount acquisition unit 106 acquires a feature amount of the image data output from the image processing unit 104. The feature amount is data expressing features of the image after the image processing. Examples of the feature amount include a gradation histogram, a full-screen average gradation, a local average gradation, a maximum gradation, and a minimum gradation.

The HDR correction unit 107 receives the enlargement mode control information input from the information acquisition unit 102. If the enlargement mode is the pixel enlargement mode, the HDR correction unit 107 generates and outputs correction information for correcting an emission luminance control value which the emission luminance control unit 108 outputs to the backlight control unit 110. Details of a method by which the HDR correction unit 107 corrects the emission luminance control value will be described below.

The emission luminance control unit 108 determines a correction parameter (image correction parameter) and a backlight control parameter based on the display mode control information input from the information acquisition unit 102 and the feature amount of the image data input from the feature amount acquisition unit 106. The image correction parameter is intended to correct the display image. The backlight control parameter is intended to make the backlight 112 emit light. The emission luminance control unit 108 outputs the image correction parameter and the backlight control parameter to the image correction unit 109 and the backlight control unit 110, respectively. Details of a method by which the emission luminance control unit 108 calculates the image correction parameter and the backlight control parameter will be described below.

The image correction unit 109 corrects the image data input from the image processing unit 104 based on the correction parameter input from the emission luminance control unit 108. The image correction unit 109 outputs the corrected display image data to the display unit 111.

The backlight control unit 110 calculates an emission control value (for example, a pulse width modulation (PWM) value) for causing backlight emission with the luminance corresponding to the input backlight control parameter. The backlight control unit 110 outputs the generated emission control value to the backlight 112.

An example of the display unit 111 is a liquid crystal panel. The display unit 111 displays a display image based on the display image data input from the image correction unit 109.

Figure 2:
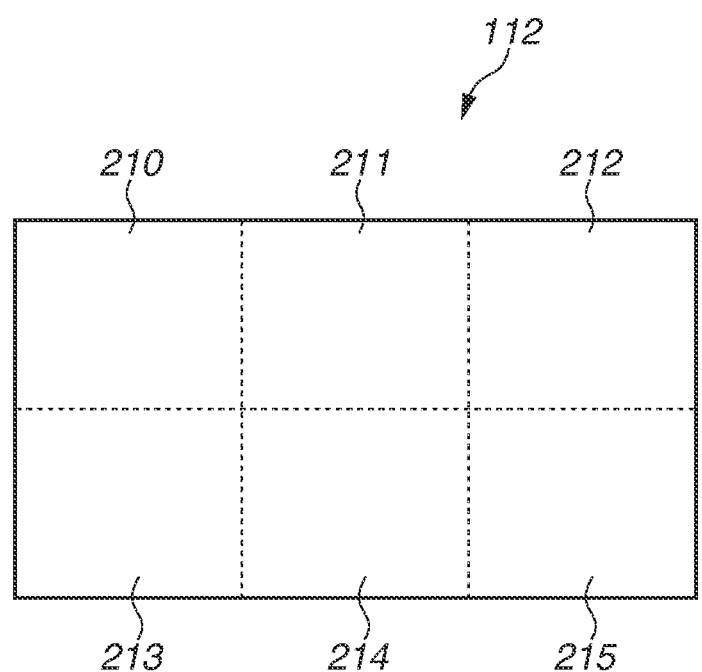
FIG. 2 is a diagram for describing regions in which a backlight can control emission luminance.

The backlight 112 is a light emitting member which includes a light emitting element such as a light-emitting diode (LED). The backlight 112 emits light from a rear surface or side surface of the display unit 111 based on the emission control value calculated by the backlight control unit 110. FIG. 2 is a diagram for describing regions in which the backlight 112 can control its emission luminance. As illustrated in FIG. 2, the backlight 112 can independently control emission luminance in each of six divided regions 210 to 215.

[Operation of Image Display Apparatus 100]

Next, an operation of the image display apparatus 100 will be described.

As described above, the image display apparatus 100 has display modes including the normal display mode and the HDR display mode. The image display apparatus 100 also has enlargement modes including an interpolation enlargement mode and a pixel enlargement mode.

In displaying an image in the interpolation enlargement mode, the image display apparatus 100 displays the image in the "normal display mode" if the normal display mode is specified, and displays the image in the "HDR display mode" if the HDR display mode is specified. In displaying an image in the pixel enlargement mode, the image display apparatus 100 displays the image in a different manner from in the interpolation enlargement mode to provide display suitable for a focus check. Specifically, if the normal display mode is specified in the pixel enlargement mode, the image display apparatus 100 displays the image in the "normal display mode". If the HDR display mode is specified, the image display apparatus 100 displays the image in a "corrected HDR display mode" which is an HDR display style corrected based on the emission luminance control unit output from the HDR correction unit 107.

An operation of the HDR correction unit 107 and the emission luminance control unit 108 in each of the "normal display mode", "HDR display mode", and "corrected HDR display mode" will be described below with reference to specific examples.

FIG. 3 is a diagram illustrating an example of an input image for describing an operation in each display mode. An input image 30 in FIG. 3 is an image of a frame included in a video image input to the image display apparatus 100. An enlarged image 31 is an image obtained by the enlargement processing unit 103 enlarging a region R surrounded by a broken line in FIG. 3.

The enlarged image 31 has gradation values of image luminance (hereinafter, referred to as image gradation values) in the range of 1 to 256 (equivalent to 8-bit gradations). Suppose that the enlarged image 31 includes a low gradation region 303 (image gradation value=1), an intermediate gradation region 304 (image gradation value=64), and a high gradation region 305 (image gradation value=256). The broken lines in the enlarged image 31 represent the boundaries between the divided regions 210 to 215 of the backlight 112. Divided images 310 to 315 correspond to the divided regions 210 to 215, respectively. In the following description, assume that the divided images 310, 311, 314, and 315 have an average gradation value of 64, the divided image 312 an average gradation value of 250, and the divided image 313 an image gradation value of 10.

(Normal Display Mode)

Initially, an operation of the HDR correction unit 107 and the emission luminance control unit 108 when the image display apparatus 100 displays the enlarged image 31 in the "normal display mode" will be described.

In the normal display mode, the emission luminance control unit 108 determines the backlight emission luminance based on the image gradation values of the input image and a lookup table (hereinafter, LUT) registered in advance. The LUT associates average values of image gradation values (hereinafter, average gradation values) of a divided image with emission luminance values. The emission luminance control unit 108 outputs a backlight control parameter for making the backlight 112 emit light with the determined backlight emission luminance to the backlight control unit 110.

Figure 4A:
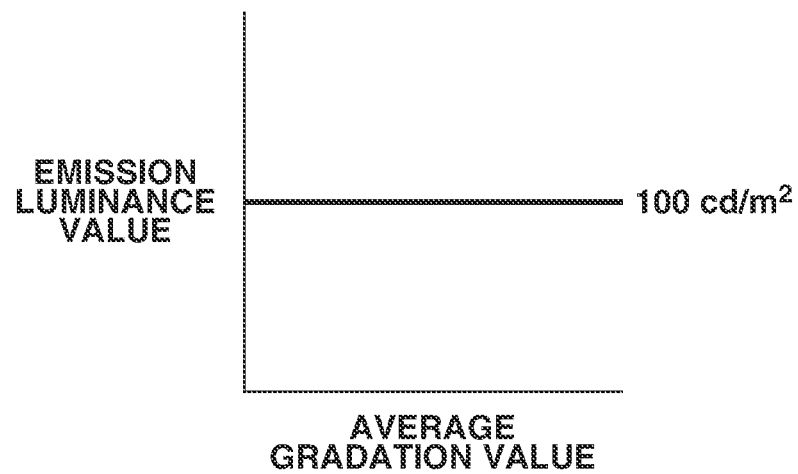
FIG. 4A is a first diagram for describing a method for determining backlight emission luminance.
Figure 4B:
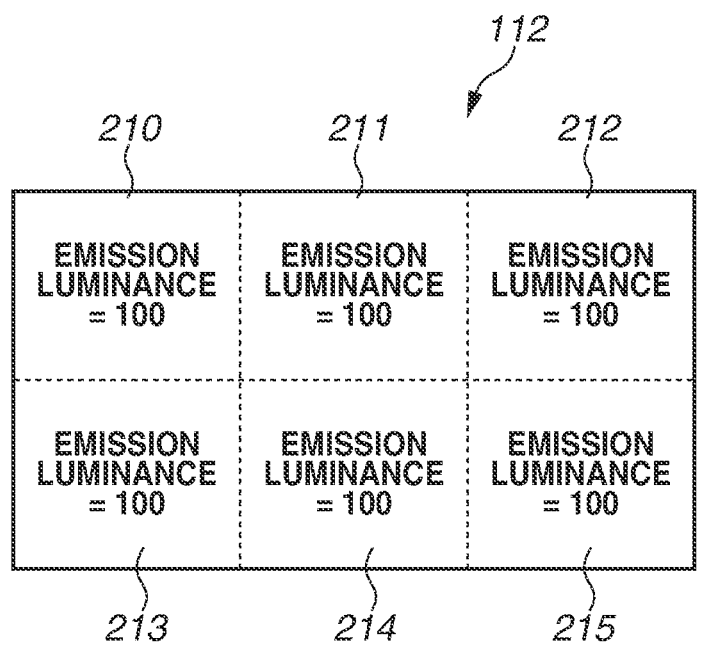
FIG. 4B is a second diagram for describing the method for determining the backlight emission luminance.

FIGS. 4A and 4B are diagrams for describing a method for determining the backlight emission luminance. FIG. 4A illustrates an example of the LUT used in determining the backlight emission luminance in the normal display mode. The horizontal axis of FIG. 4A indicates the average gradation value of the input image. The vertical axis indicates the emission luminance value. The emission luminance control unit 108 refers to the LUT illustrated in FIG. 4A and determines the emission luminance values of the divided regions 210 to 215 of the backlight 112 based on the average gradation values of the divided images 310 to 315. In the LUT illustrated in FIG. 4A, the emission luminance value is set to a constant value regardless of the average gradation value of the input image.

FIG. 4B illustrates the result of determination of the backlight emission luminance in each of the divided regions 210 to 215 by the emission luminance control unit 108 based on the LUT illustrated in FIG. 4A. As illustrated in FIG. 4B, in the normal display mode, the emission luminance control unit 108 makes the backlight 112 emit light with constant emission luminance (here, 100 $cd/m^2$) across the entire screen of the backlight 112 regardless of the average gradation values of the divided images 310 to 315.

The emission luminance control unit 108 further determines an image correction parameter for correcting the input image corresponding to the backlight emission luminance, and outputs the determined image correction parameter to the image correction unit 109. The image correction parameter is information indicating a relationship between the gradation values of the input image (hereinafter, referred to as input gradation values) and the gradation values of the corrected image (hereinafter, referred to as corrected gradation values).

Figure 5A:
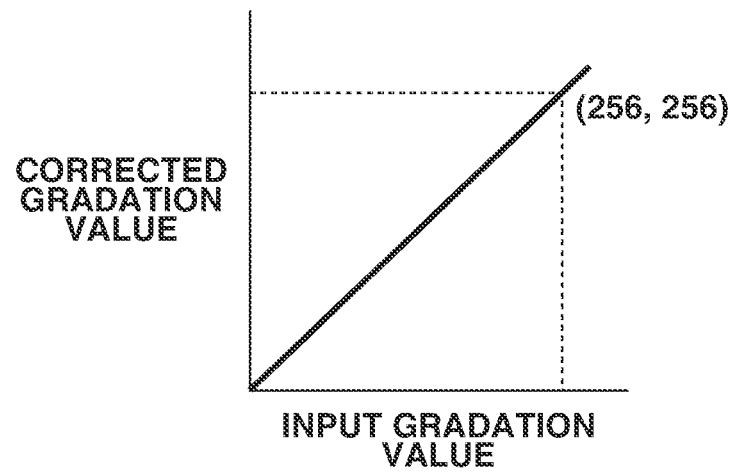
FIG. 5A is a first diagram for describing image correction in a normal display mode.
Figure 5B:
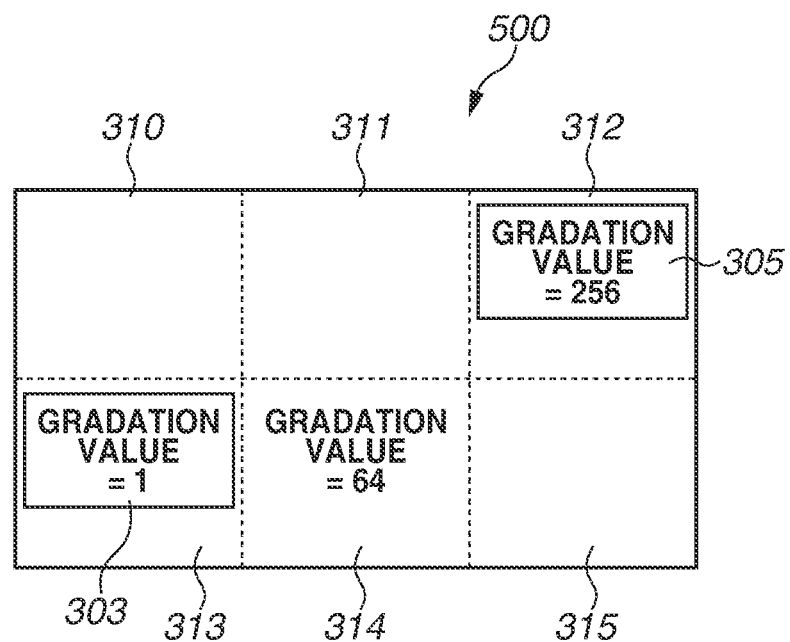
FIG. 5B is a second diagram for describing the image correction in the normal display mode.

FIGS. 5A and 5B are diagrams for describing image correction in the normal display mode. FIG. 5A is a diagram illustrating an example of the image correction parameter used in the normal display mode. The image correction parameter illustrated in FIG. 5A is such that the input gradation value and the corrected gradation value are equal. In the normal display mode, the backlight emission luminance is constant regardless of the gradations of the image. The image correction unit 109 uses the image correction parameter illustrated in FIG. 5A to not correct the input image according to the backlight emission luminance. The format of the image correction parameter is not limited to a table format like that of FIG. 5A, and may be a calculation formula with the input image as an argument.

FIG. 5B illustrates a corrected image 500 which is the result of correction of the input image by the image correction unit 109 by using the image correction parameter illustrated in FIG. 5A. As illustrated in FIG. 5B, the corrected image 500 has the same gradation distribution as that of the enlarged image 31 illustrated in FIG. 3.

If the backlight emission luminance is in the state of the emission luminance values illustrated in FIG. 4B and the corrected image 500 of FIG. 5B is displayed, the display luminance for the user to visually perceive is the luminance on the surface of the display unit 111. The display luminance is determined by the light of the backlight 112 being transmitted with transmittance according to the gradation values of the image displayed on the display unit 111. The display luminance is expressed by the following equation:

$$\text{Display luminance} = (\text{gradation value of corrected image}/\text{maximum gradation value of corrected image}) \times \text{backlight emission luminance}.$$

Figure 6:
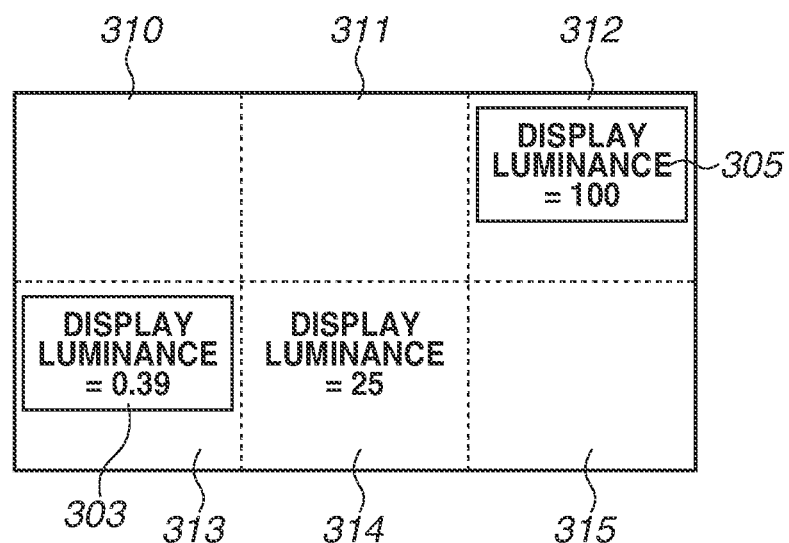
FIG. 6 is a diagram illustrating a distribution of display luminance.

FIG. 6 is a diagram illustrating a distribution of display luminance calculated based on the distribution of backlight emission luminance of FIG. 4B and the distribution of the image gradation values of FIG. 5B. As illustrated in FIG. 6, the low gradation region 303 has a display luminance of 0.39 cd/m². The intermediate gradation region 304 has a display luminance of 25 cd/m². The high gradation region 305 has a display luminance of 100 cd/m². The resulting contrast ratio is 256:1.

In the normal display mode, the emission luminance control unit 108 does not use the correction information input from the HDR correction unit 107. The HDR correction unit 107 may be configured to not generate correction information in the normal display mode.

(HDR Display Mode)

Next, an operation of the HDR correction unit 107 and the emission luminance control unit 108 when the image display apparatus 100 displays the enlarged image 31 in the "HDR display mode" will be described. In the "HDR display mode", as with the "normal display mode", the emission luminance control unit 108 determines the backlight emission luminance based on the image gradation values of the input image and an LUT registered in advance.

Figure 7A:
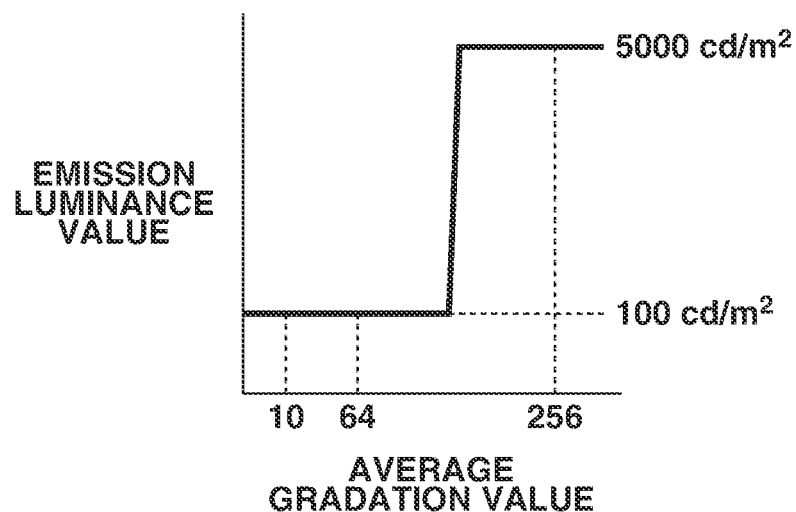
FIG. 7A is a first diagram for describing a method for determining the backlight emission luminance in a high dynamic range (HDR) display mode.
Figure 7B:
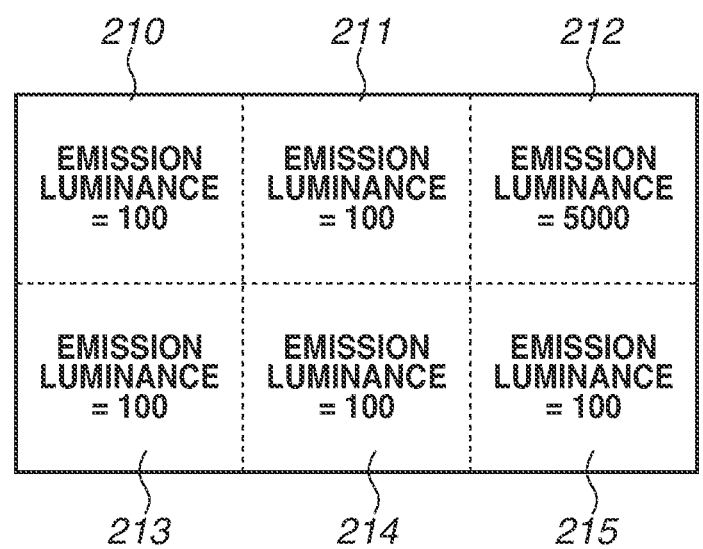
FIG. 7B is a second diagram for describing the method for determining the backlight emission luminance in the HDR display mode.

FIGS. 7A and 7B are diagrams for describing a method for determining the backlight emission luminance in the HDR display mode. FIG. 7A illustrates an example of the LUT that the emission luminance control unit 108 refers to in determining the backlight emission luminance in the HDR display mode. The LUT illustrated in FIG. 7A is one for setting the backlight emission luminance of a divided region in which the average gradation value of the input image is higher than or equal to a predetermined value at an emission luminance higher than normal (here, 5000 cd/m²).

FIG. 7B is a diagram illustrating the result of determination of the backlight emission luminance in each of the divided regions 210 to 215 by the emission luminance control unit 108 based on the LUT illustrated in FIG. 7A. As illustrated in FIG. 7B, in the HDR display mode, the backlight 112 emits light with the normal backlight emission luminance of 100 cd/m² in the divided regions 210, 211, and 213 to 215 in which the average gradation value is 10 or 64. The emission luminance control unit 108 makes the backlight 112 emit light with a backlight luminance 50 times the normal backlight emission luminance, or 5000 cd/m², in the divided region 212 in which the average gradation value is 250. In such a manner, the image display apparatus 100 can increase the display luminance corresponding to a bright image having a high image luminance value. The image display apparatus 100 thereby enables the user to view a high contrast image.

The emission luminance control unit 108 further determines an image correction parameter for correcting the image gradation values of the input image according to the backlight emission luminance, and outputs the determined image correction parameter to the image correction unit 109. In the HDR display mode, the backlight 112 emits light with the normal backlight emission luminance in the divided regions 210, 211, and 213 to 215. The image display apparatus 100 therefore do not correct the image gradation values of the divided images 310, 311, and 313 to 315. In other words, the image correction unit 109 uses the correction parameter illustrated in FIG. 5A to not correct the image included in the divided images 310, 311, and 313 to 315.

In the divided region 202, the backlight emission luminance is 50 times the normal backlight emission luminance. The image correction unit 109 then performs correction processing corresponding to the backlight emission luminance 50 times the normal on the divided image 312.

Figure 8A:
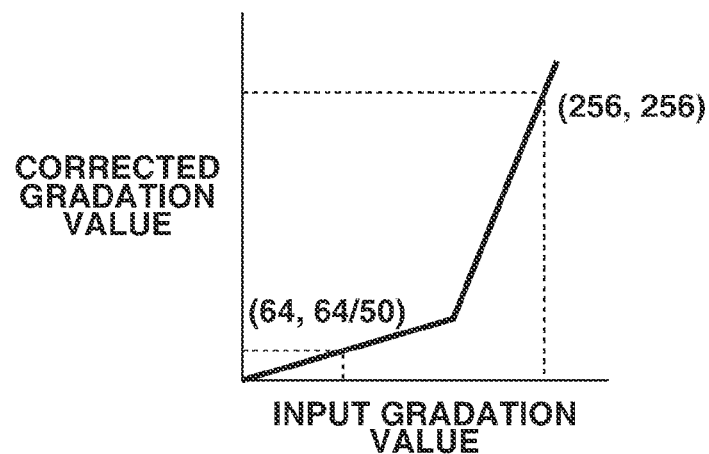
FIG. 8A is a first diagram for describing image correction in the HDR display mode.
Figure 8B:
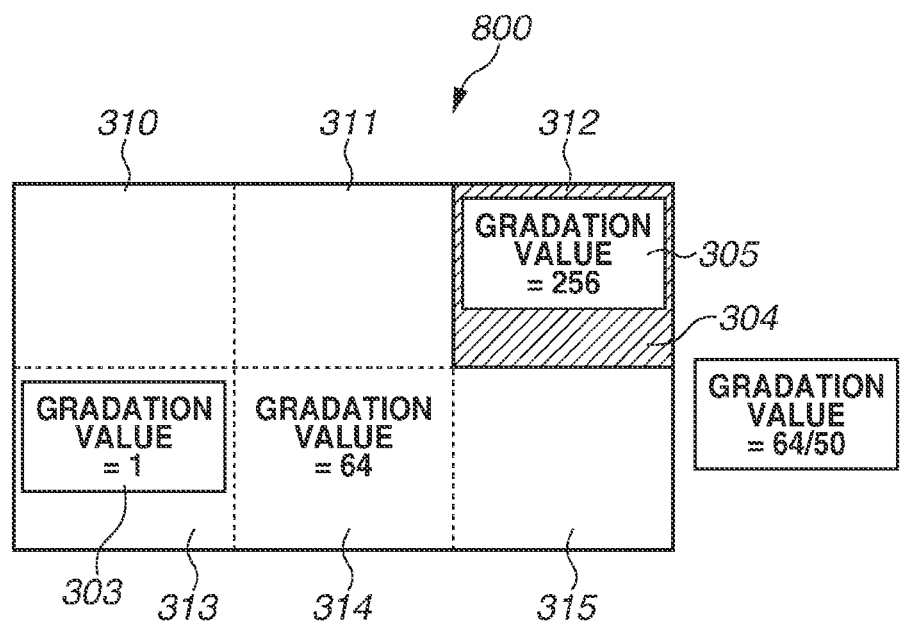
FIG. 8B is a second diagram for describing the image correction in the HDR display mode.

FIGS. 8A and 8B are diagrams for describing the image correction in the HDR display mode. FIG. 8A is a diagram illustrating a correction parameter corresponding to the LUT of FIG. 7A, which the image correction unit 109 uses for the divided region 202.

The correction parameter illustrated in FIG. 8A is such that intermediate and low gradation pixels have gradation values lower than the image gradation values of the input image. The image correction unit 109 can use such a correction parameter to correct the display luminance corresponding to the intermediate and lower radiation pixels to not be high. The image correction unit 109 can selectively increase the gradation values of high gradation pixels of which the image gradation values of the input image are high, included in the divided image 312 in which the backlight emission luminance is set to be 50 times, to enable high display luminance.

The image correction unit 109 may perform the correction processing for appropriately adjusting the gradation distribution according to different levels of backlight emission luminance based on gradation distributions suitable for the respective levels of backlight emission luminance, obtained by experiment in advance.

FIG. 8B is a diagram illustrating a corrected image 800 which is the result of correction of the input image 30 by the image correction unit 109 by using the image correction parameter of FIG. 8A. As illustrated in FIG. 8B, among the regions included in the divided image 312, the high gradation region 305 having a gradation value of 256 is output with a gradation value of 256. The intermediate gradation region 304 (shaded region) having a gradation value of 64 in the divided image 312 is output with a gradation value corrected by ⅟₅₀ times.

Figure 9:
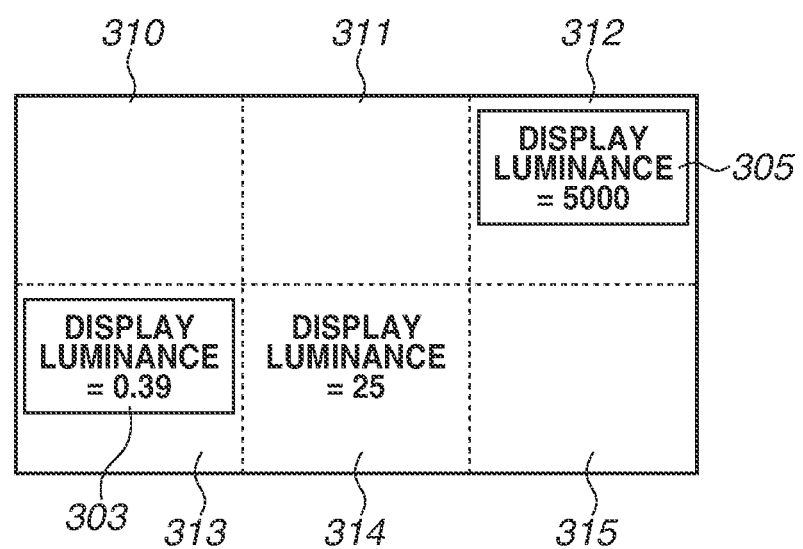
FIG. 9 is a diagram illustrating a distribution of display luminance that a user visually perceives in the HDR display mode.

FIG. 9 is a diagram illustrating a distribution of display luminance which the user visually perceives when the display unit 111 displays the enlarged image 31 in the HDR display mode. As illustrated in FIG. 9, the low gradation region 303 has a display luminance of 0.39 cd/m². The intermediate gradation region 304 has a display luminance of 25 cd/m². The high gradation region 305 has a display luminance of 5000 cd/m². The resulting contrast ratio is 12800:1, which is higher than in the normal display mode.

As described above, the HDR display mode can be used to increase the contrast ratio. This enables expression with higher presence, for example, if the high gradation region 305 includes an image of an object having high image gradation values like the sky and fair weather.

The threshold of gradation values at which to switch from normal emission luminance to high emission luminance in the LUT illustrated in FIG. 7A, and the emission luminance value for the high emission luminance, may be arbitrarily adjusted. The contents of the LUT for the HDR display mode are not limited to those illustrated in FIG. 7A.

Figure 10A:
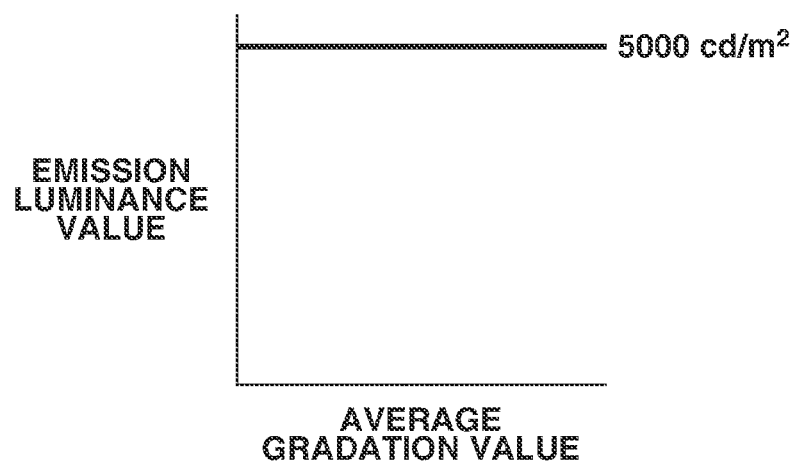
FIG. 10A is a first diagram illustrating an example of another lookup table (LUT).
Figure 10B:
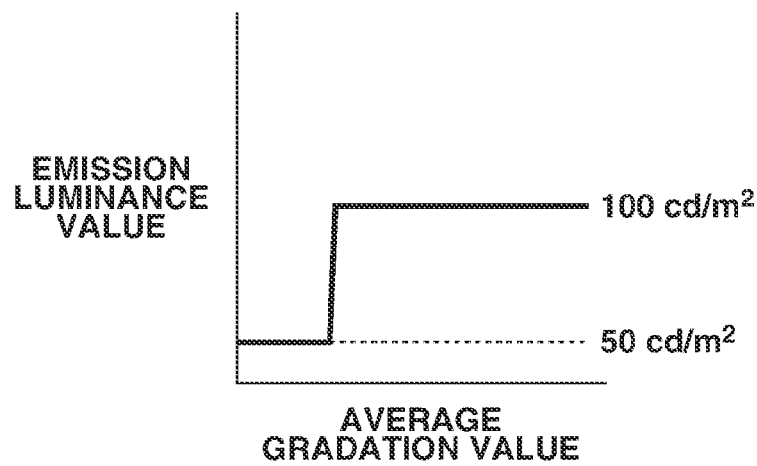
FIG. 10B is a second diagram illustrating an example of yet another LUT.

FIGS. 10A and 10B are diagrams illustrating other examples of the LUT. For example, as illustrated in FIG. 10A, the LUT in the HDR display mode may be one for making the backlight 112 emit light with a backlight emission luminance 50 times the normal backlight emission luminance (here, 5000 cd/m²) over the entire surface of the backlight 112. As illustrated in FIG. 10B, the LUT may be such that the backlight emission luminance in a divided region or regions in which the average gradation value of the input image is lower than or equal to a predetermined value is set to be lower than the normal backlight emission luminance (here, 50 cd/m²).

In the HDR display mode, the emission luminance control unit 108 does not use the correction information input from the HDR correction unit 107. Like the normal display mode, the HDR correction unit 107 may be configured to not generate correction information in the HDR display mode.

(Corrected HDR Display Mode)

Next, an operation of the HDR correction unit 107 and the emission luminance control unit 108 when the image display apparatus 100 displays the enlarged image 31 in the "corrected HDR display mode" will be described.

The HDR correction unit 107 receives the enlargement mode control information input from the information acquisition unit 102. If the display mode is the pixel enlargement mode, the HDR correction unit 107 outputs HDR correction information for switching a control method of the emission luminance control unit 108. For example, the HDR correction unit 107 transmits HDR correction information indicating an upper limit value and a lower limit value of the backlight emission luminance value. The upper and lower limit values are determined by experimentally measuring beforehand the thresholds of the backlight emission luminance at which a focus check becomes difficult during pixel enlargement display. In the present exemplary embodiment, for example, the upper limit value is 500 cd/m$^2$ and the lower limit value is 50 cd/m$^2$.

The emission luminance control unit 108 receives the HDR correction information indicating the upper and lower limit values, and corrects the LUT illustrated in FIG. 7A by using the upper and lower limit values indicated by the HDR correction information. Specifically, the maximum value of the backlight emission luminance in the LUT of FIG. 7A is 5000 cd/m$^2$. The emission luminance control unit 108 performs limit processing to set the maximum value of the backlight emission luminance at the upper limit value of 500 cd/m$^2$. Specifically, the emission luminance control unit 108 replaces all emission luminance values above 500 cd/m$^2$ with 500 cd/m$^2$.

Figure 11A:
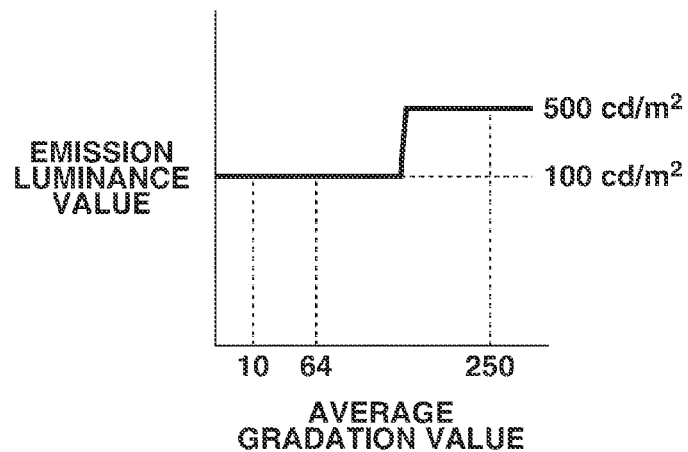
FIG. 11A is a first diagram for describing limit processing.
Figure 11B:
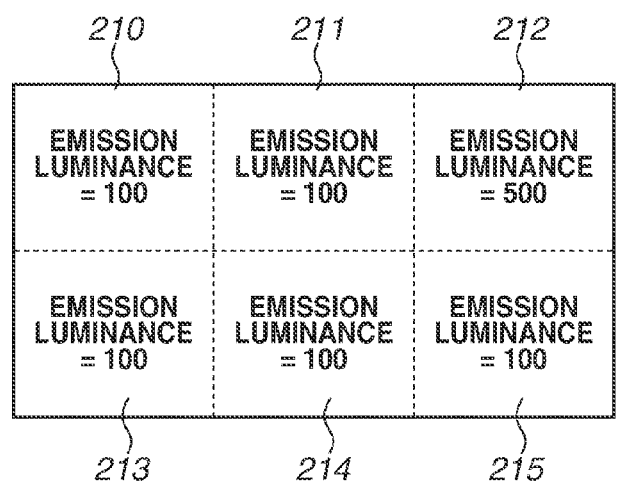
FIG. 11B is a second diagram for describing the limit processing.

FIGS. 11A and 11B are diagrams for describing the limit processing. FIG. 11A is a diagram illustrating the LUT obtained by the limit processing of the emission luminance control unit 108. FIG. 11B is a diagram illustrating the backlight emission luminance determined by the emission luminance control unit 108 based on the LUT illustrated in FIG. 11A. As illustrated in FIG. 11B, the backlight emission luminance is at the normal backlight emission luminance of 100 cd/m$^2$ in the divided regions 210, 211, and 213 to 215 in which the average gradation value is 10 or 64. In the divided region 212 in which the average gradation value is 250, the backlight emission luminance is five times the normal backlight emission luminance, or 500 cd/m$^2$.

The emission luminance control unit 108 also determines an image correction parameter for correcting the input image according to the backlight emission luminance, and outputs the determined image correction parameter to the image correction unit 109. Since light is emitted with the normal backlight emission luminance in the divided regions 210, 211, and 213 to 215, the image correction unit 109 does not correct the divided images 310, 311, and 313 to 315, and uses a correction parameter such as illustrated in FIG. 5A. In the divided region 212, the backlight emission luminance is five times the normal backlight emission luminance. The image correction unit 109 then applies correction processing corresponding to the backlight emission luminance to the divided image 312.

Figure 12A:
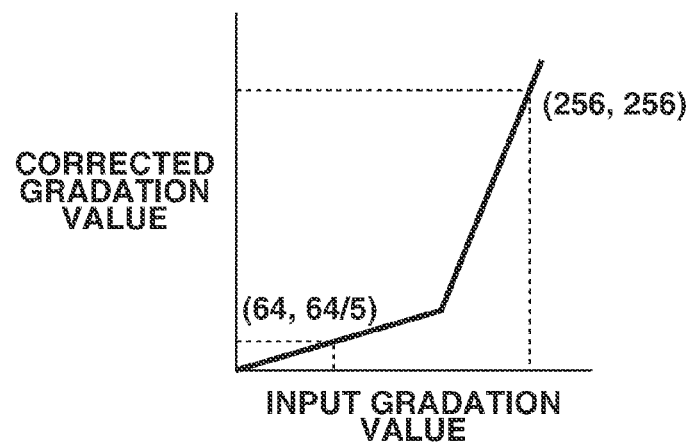
FIG. 12A is a first diagram for describing correction processing in a corrected HDR display mode.
Figure 12B:
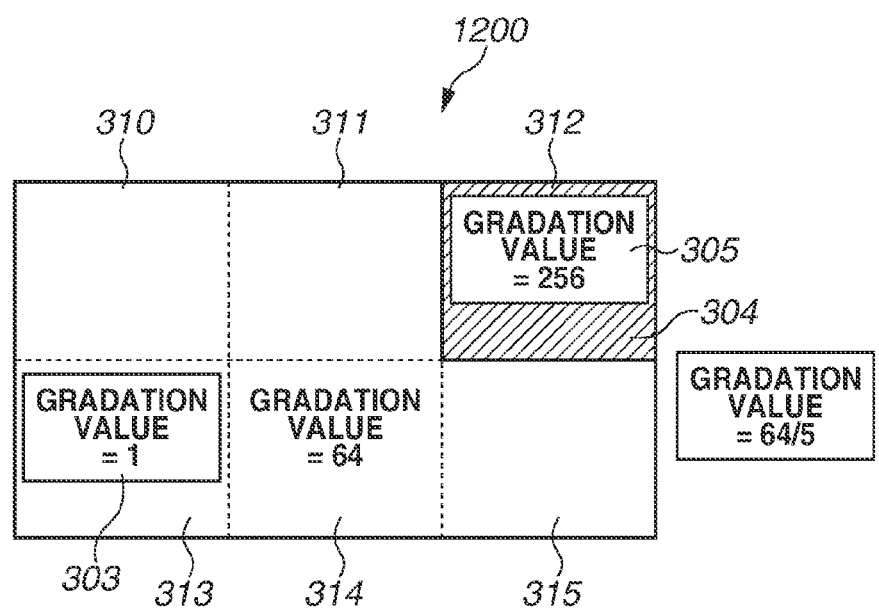
FIG. 12B is a second diagram for describing the correction processing in the corrected HDR display mode.

FIGS. 12A and 12B are diagrams for describing the correction processing in the corrected HDR display mode. FIG. 12A is a diagram illustrating the correction parameter corresponding to the LUT of FIG. 11A. FIG. 12B is a diagram illustrating a corrected image 1200 which is the result of correction of the image gradation values by the image correction unit 109 based on the correction parameter illustrated in FIG. 12A. As illustrated in FIG. 12B, the high gradation region 305 having a gradation value of 256 in the divided image 312 is output with a gradation value of 256. The intermediate gradation region 304 (shaded region) having a gradation value of 64 in the divided image 312 is output with a gradation value corrected by ⅕ times.

Figure 13:
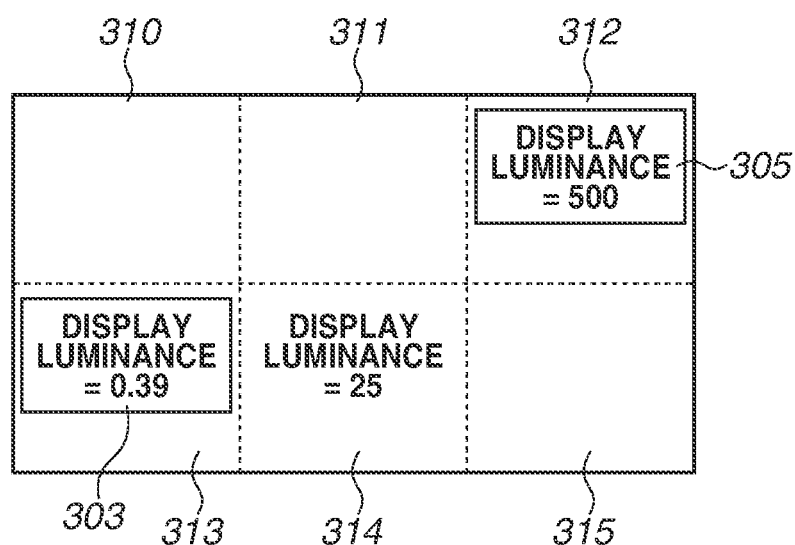
FIG. 13 is a diagram illustrating a distribution of display luminance that the user visually perceives in the corrected HDR display mode.

FIG. 13 is a diagram illustrating a distribution of display luminance which the user visually perceives when the display unit 111 displays the enlarged image 31 in the corrected HDR display mode. As illustrated in FIG. 13, the display luminance of the high gradation region 305 is limited to 500 cd/m$^2$ which is ¹⁄₁₀ times when the HDR correction unit 107 does not perform the correction processing. The contrast ratio is also limited to ¹⁄₁₀ times, or 1280:1.

As described above, the display control unit 105 provides the upper and lower limit values for the backlight emission luminance. The display control unit 105 can thereby control the second display luminance used in displaying the enlarged image 31 in the corrected HDR display mode to a narrower range of display luminance than that of the first display luminance used in the HDR display mode. The display control unit 105 then can display the display image so that the region including the enlarged image of the input image has display luminance (second display luminance) lower than that of the other regions. This can reduce a possibility that an enlargement image is enlarged and displayed with the luminance maintained high and a focus check becomes difficult due to glare. A possibility that the user looks closely at or near the region of high luminance and the efficiency of the focus check operation decreases can also be reduced.

In the foregoing description, the maximum emission luminance is described to be suppressed by using the upper limit value of the emission luminance. Similarly, the minimum emission luminance may be increased by using the lower limit value of the emission luminance. This can prevent the emission luminance of the pixel enlargement region from becoming so low that a focus check becomes difficult.

The HDR correction information output from the HDR correction unit 107 may be information other than the upper and lower limit values of the backlight emission luminance value. For example, the HDR correction information may be an LUT indicating emission luminance suitable for pixel enlargement display, measured by experiment in advance.

Figure 14A:
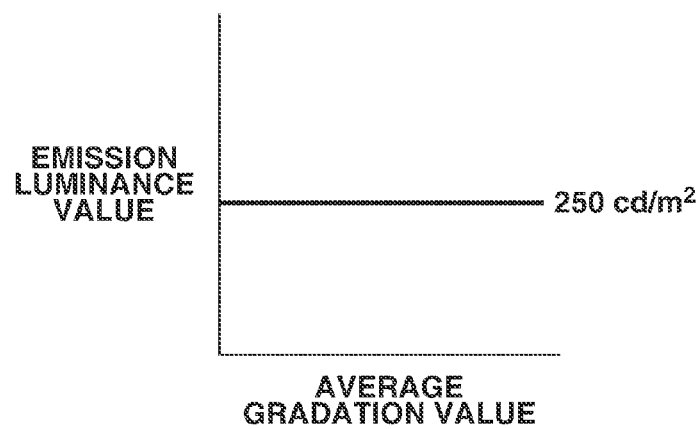
FIG. 14A is a first diagram illustrating an example of an LUT used as HDR correction information.
Figure 14B:
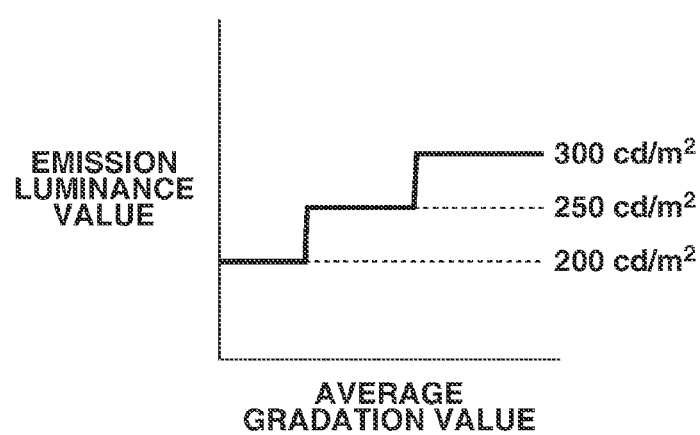
FIG. 14B is a second diagram illustrating an example of the LUT used as the HDR correction information.
Figure 14C:
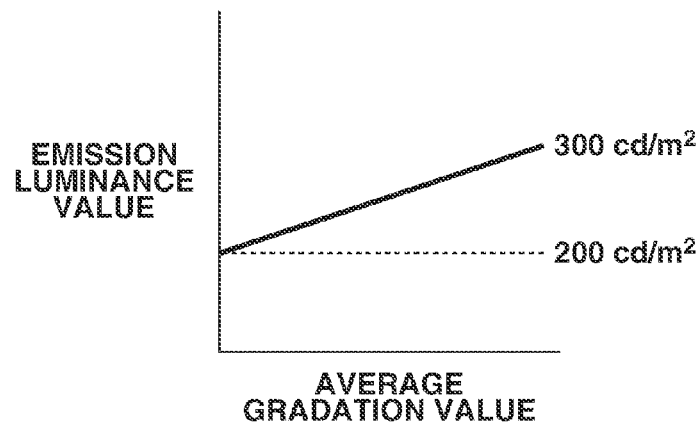
FIG. 14C is a third diagram illustrating an example of the LUT used as the HDR correction information.

FIGS. 14A, 14B, and 14C are diagrams illustrating examples of the LUT used as the HDR correction information. FIGS. 14A, 14B, and 14C illustrate examples of the LUT when a range of emission luminance of 200 cd/m$^2$ to 300 cd/m$^2$ is suitable for pixel enlargement. FIG. 14A illustrates an LUT for making the backlight 112 emit light with a center value of the range of emission luminance suitable for pixel enlargement regardless of the average gradation value. FIGS. 14B and 14C illustrate LUTs for adjusting the backlight emission luminance based on the average gradation value, within the range suitable for pixel enlargement.

During pixel enlargement display, the HDR correction unit 107 outputs an LUT such as illustrated in FIG. 14A, 14B, or 14C to the emission luminance control unit 108. The emission luminance control unit 108 determines the backlight emission luminance based on the LUT. As a result, the display image is displayed within the range of emission luminance suitable for pixel enlargement. This can reduce the possibilities that the user has difficulty in performing a focus check due to glare and that the focus check efficiency decreases.

The HDR correction unit 107 may output control information for cancelling the HDR display mode and restoring the normal display mode as the HDR correction information. In such a case, the backlight emission luminance of the high gradation region 305 is set at the emission luminance in the normal display mode, or 100 cd/m$^2$, as illustrated in FIGS. 4A and 4B. The backlight emission luminance can thus be limited to $\frac{1}{50}$ times the emission luminance in the HDR display mode. This can also reduce the possibilities that the user has difficulty in performing a focus check due to glare and that the focus check efficiency decreases.

The HDR correction unit 107 may switch the HDR correction information according to an input signal from an external sensor serving as a detection unit for detecting an intensity of external light. For example, the glare perceived by the user can vary between when the user looks closely at a bright screen in a dark environment and when the user looks closely at the bright screen in a bright environment. With this in consideration, the HDR correction unit 107 may switch HDR correction information based on the ambient brightness detected by an optical sensor. Specifically, the HDR correction unit 107 obtains the ambient light in the location where the image display apparatus 100 is installed by using an optical sensor. If the location where the image display apparatus 100 is installed is bright, the HDR correction unit 107 increases the setting of the upper limit value for the backlight emission luminance value. If the location is dark, the HDR correction unit 107 reduces the setting of the upper limit value. In such a manner, the display control unit 105 can determine the range of the second display luminance to suitably adjust the display luminance to the ambient brightness based on the intensity of the external light detected by the optical sensor serving as a detection unit.

The HDR correction unit 107 may further output control information for changing a time constant in changing the backlight emission luminance according to a change in the average gradation value of the image data as the HDR correction information. For example, the HDR correction unit 107 outputs a filter coefficient for not immediately applying the backlight emission luminance value calculated from an LUT but performing low-pass filter processing on the calculated backlight emission luminance value before application. If the input image changes in image luminance, the HDR correction unit 107 serving as a display control unit can thus change the display luminance at a speed lower than the speed of change of the image luminance. Consequently, even if a bright object suddenly comes into a region under pixel enlargement, the emission luminance of the region at which the user is looking closely can be prevented from increasing sharply. This can reduce possibilities that the user's eyes fail to adapt quickly enough and a focus check becomes difficult and that the focus check efficiency decreases.

The HDR correction unit 107 may adjust the frequency at which the display luminance is changed according to a change in the average gradation value of the image data to be lower than a predetermined frequency. For example, the HDR correction unit 107 may be configured to not change the backlight emission luminance if the average gradation value changes before a predetermined period elapses after a change of the backlight emission luminance. This can prevent the luminance of the backlight 112 from changing frequently to fatigue the user.

The image display apparatus 100 does not need to apply HDR correction processing performed based on the HDR correction information to the entire screen. For example, if an enlarged image is superimposed and displayed on an unenlarged image, the image display apparatus 100 may apply the HDR correction processing to only the pixel enlargement region. The reason is that the region for the user to look closely at is the pixel enlargement region. In such a case, the HDR correction unit 107 obtains coordinate information about the superimposed display of the enlargement image from the enlargement processing unit 103, and outputs the coordinate information along with the HDR correction information. The emission luminance control unit 108 refers to the coordinate information input from the HDR correction unit 107, calculates a corrected HDR parameter for the region where the enlargement image is displayed, and calculates a conventional HDR parameter for the region where the enlargement image is not displayed.

In the present exemplary embodiment, the emission luminance control unit 108 controls the display luminance during HDR display by changing the backlight emission luminance and the correction parameter of the input image. However, the emission luminance control unit 108 may control the display luminance by changing either the backlight emission luminance or the correction parameter of the input image. If the emission luminance control unit 108 controls the display luminance by changing only the backlight emission luminance, the backlight emission luminance may be able to be independently controlled in units of pixels or with granularity equivalent to that in units of pixels. Such control of the backlight emission luminance can provide HDR display without giving the user a sense of incongruity.

[Flowchart of Operation of Image Display Apparatus 100]

Figure 15:
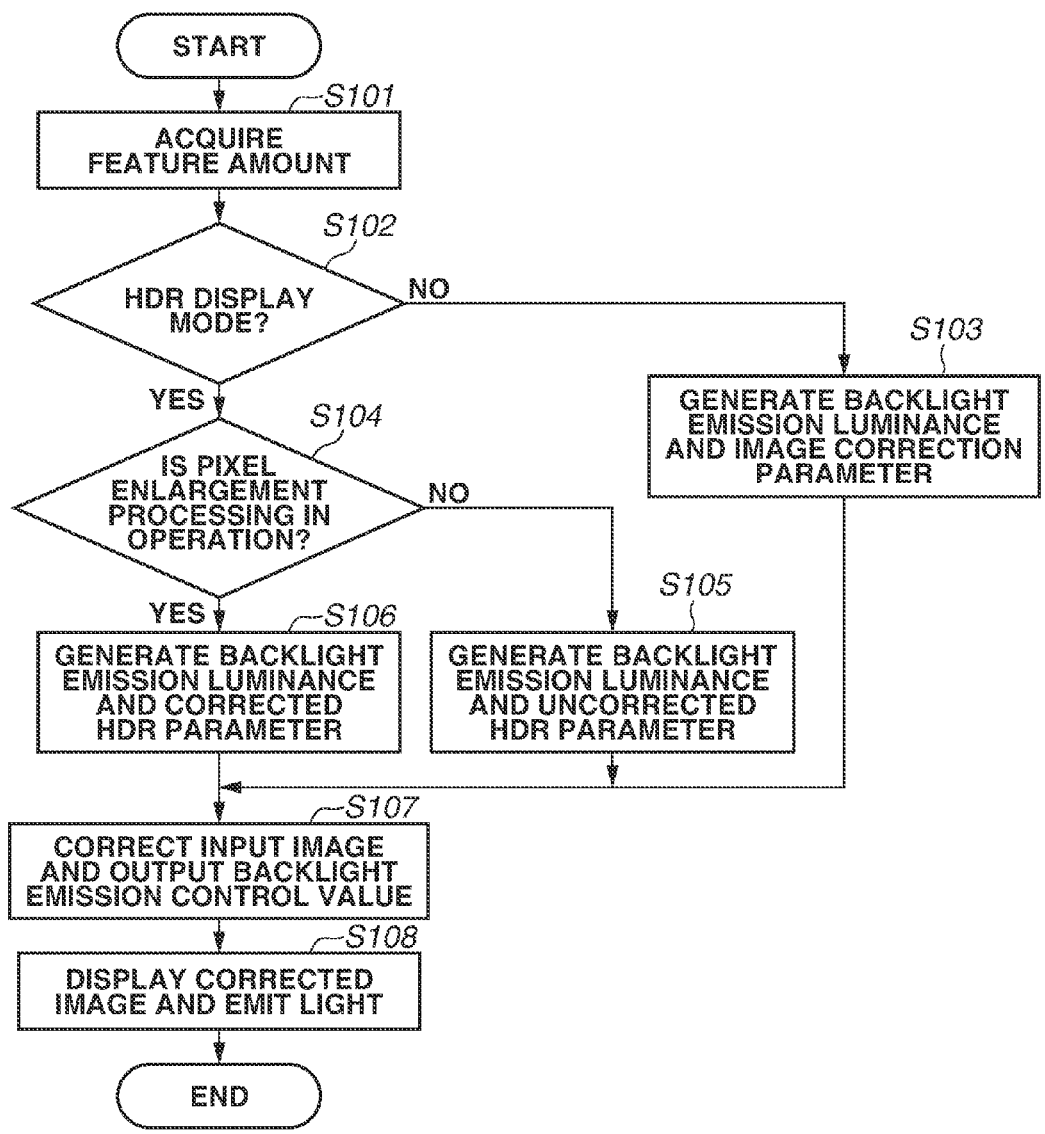
FIG. 15 is a flowchart illustrating an operation of the image display apparatus.

FIG. 15 is a flowchart illustrating an operation of the image display apparatus 100.

In step S101, the feature amount acquisition unit 106 acquires the feature amount of the image data that is input from the image acquisition unit 101 and to which enlargement processing and image processing are applied. In step S102, if the display mode is the normal display mode (NO in step S102), the processing proceeds to step S103. In step S103, the emission luminance control unit 108 generates backlight emission luminance and an image correction parameter by using the LUT for the normal display mode.

In step S102, if the display mode is the HDR display mode (YES in step S102), the processing proceeds to step S104. In step S104, the emission luminance control unit 108 switches processing depending on whether the pixel enlargement processing is in operation. If the pixel enlargement processing is not in operation (NO in step S104), the processing proceeds to step S105. In step S105, the emission luminance control unit 108 generates backlight emission luminance and an image correction parameter (uncorrected HDR parameter) by using the LUT for the HDR display mode. If the pixel enlargement processing is in operation (YES in step S104), the processing proceeds to step S106. In step S106, the HDR correction unit 107 outputs the HDR correction information to the emission luminance control unit 108. The emission luminance control unit 108 generates backlight emission luminance and an image correction parameter (corrected HDR parameter) based on the HDR correction information and the LUT.

In step S107, the image correction unit 109 corrects the input image based on the input correction parameter. The backlight control unit 110 outputs a backlight emission control value according to the input parameter. In step S108, the display unit 111 displays the corrected image. The backlight 112 emits light based on the backlight emission control value.

[Modification 1]

In the foregoing description, an HDR correction is described to be performed on the image that is pixel-enlarged by the enlargement processing unit 103. However, the HDR correction may be performed on an image that is pixel-enlarged by an external apparatus. In such a case, the image acquisition unit 101 initially functions as a determination unit that analyzes the input image and determines whether the input image is an enlargement image including interpolated pixels generated by duplicating nearby pixels. The information acquisition unit 102 acquires the result of determination made by the image acquisition unit 101 serving as the determination unit that the input image includes interpolated pixels as the enlargement information.

More specifically, the image acquisition unit 101 analyzes the gradation values of all the pixels of the input image, and determines whether the pixels have the same gradation values as those of adjoining pixels. If the gradation values are the same, the image acquisition unit 101 determines that the input image is an enlargement image. If the image acquisition unit 101 determines that the input image is an enlargement image, the HDR correction unit 107 outputs the HDR correction information for switching the control method of the emission luminance control unit 108, and the HDR correction is performed. If adjoining pixels in only a partial region of the input image have the same gradation values, the image display apparatus 100 may perform the HDR correction on only that region.

[Modification 2]

In the foregoing description, the display mode is described to be switched based on the instruction from the user, acquired by the information acquisition unit 102. However, the image display apparatus 100 may switch the display mode by other means. For example, the image display apparatus 100 may automatically switch the display mode according to the feature amount acquired by the feature amount acquisition unit 106. In such a case, for example, the image display apparatus 100 automatically enters the HDR display mode if a histogram of the input image acquired by the feature amount acquisition unit 106 indicates that the variance of the gradation values of the input image is greater than a predetermined value. If information for specifying a display mode is added as metadata to the image data, a metadata extraction unit (not illustrated) may extract the metadata and the image display apparatus 100 may automatically switch the display mode based on the extraction result.

As described above, the image display apparatus 100 according to the present exemplary embodiment can switch the HDR display style between during normal display or interpolation enlargement and during pixel enlargement. As a result, during HDR display with pixel enlargement, the image display apparatus 100 prevents pixel enlargement display with emission luminance at which the user has difficulty in looking closely or with emission luminance at which edges are difficult to observe. This can improve convenience of a focus check operation during the HDR display.

Figure 16:
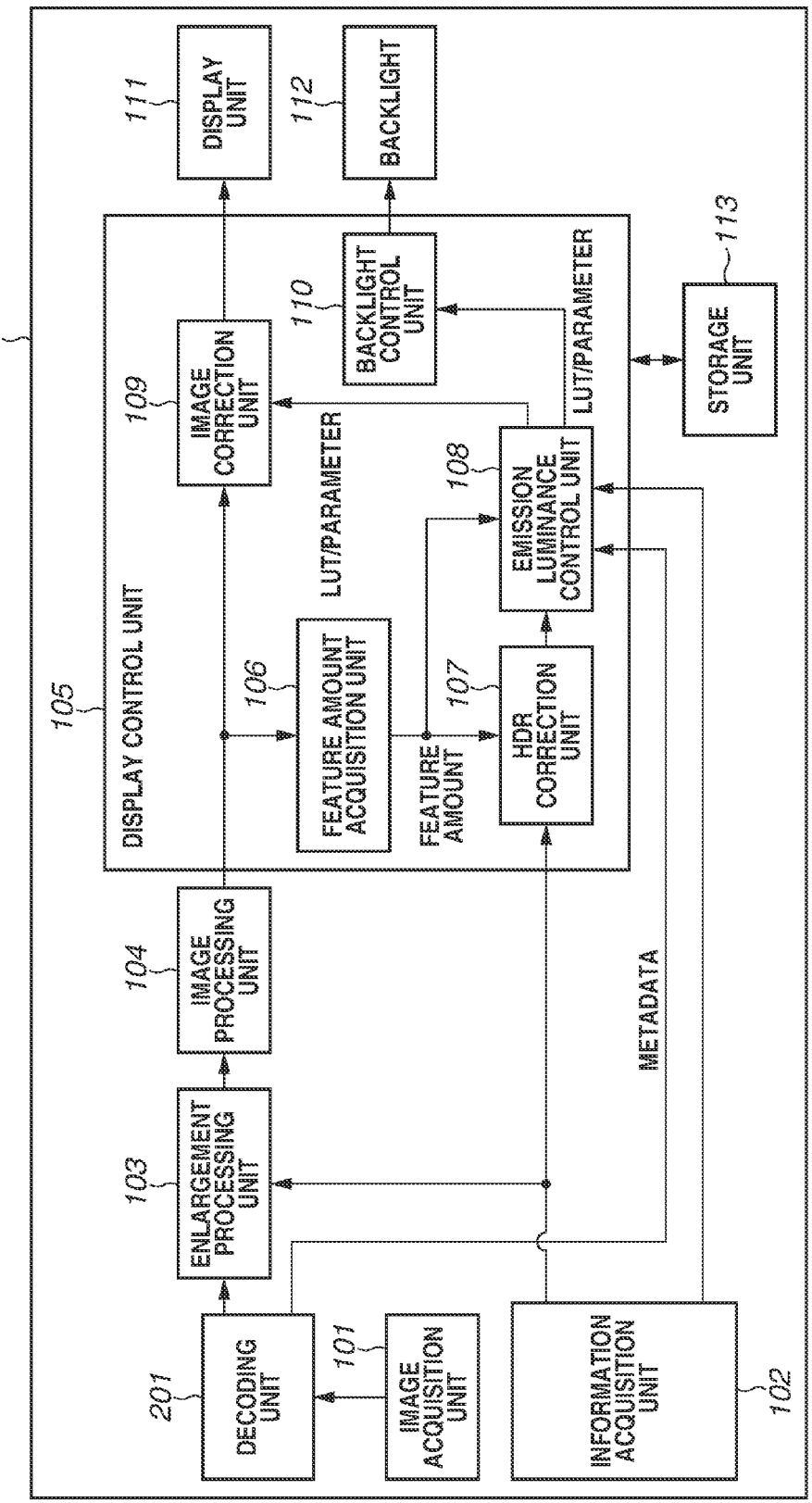
FIG. 16 is a block diagram illustrating a configuration of an image display apparatus according to a second exemplary embodiment.

FIG. 16 is a block diagram illustrating a configuration of an image display apparatus 200 according to a second exemplary embodiment. As illustrated in FIG. 16, the image display apparatus 200 further includes a decoding unit 201 in addition to the functional units illustrated in FIG. 1. In FIG. 16, functional units similar to those of the image display apparatus 100 according to the first exemplary embodiment illustrated in FIG. 1 are designated by the same reference numerals. A description thereof will be omitted.

In the present exemplary embodiment, the image acquisition unit 101 receives image data (hereinafter, referred to as an encoded image) to which information (hereinafter, referred to as display luminance information) about display luminance during image display is added as metadata. The image acquisition unit 101 outputs the encoded image to the decoding unit 201. The display control unit 105 determines the display luminance of the display unit 111 based on the display luminance information. For example, if the information acquisition unit 102 does not acquire enlargement information, the display control unit 105 determines the display luminance of the display unit 111 based on the display luminance information. If the information acquisition unit 102 acquires enlargement information, the display control unit 105 determines the display luminance of the display unit 111 without taking into account the display luminance information. Examples of the metadata include data that is added by the person who has captured the image or editor of the image to reflect the person's or editor's intention. Details of the encoded image will be described below.

The decoding unit 201 decodes the encoded image input from the image acquisition unit 101. The decoding unit 201 outputs the decoded image data to the enlargement processing unit 103, and outputs the display luminance information to the emission luminance control unit 108.

The information acquisition unit 102 receives display mode instruction information from the user via a remote controller, a touch panel, or a cursor. The information acquisition unit 102 converts the received display mode instruction information into display mode control information, and outputs the display mode control information to the emission luminance control unit 108.

The image display apparatus 200 has display modes including a normal display mode and a metadata HDR display mode. The metadata HDR display mode is a mode in which an image is displayed based on the display luminance information added to the encoded image. If information for specifying a display mode is added as metadata to the image data, the image display apparatus 200 extracts the metadata from the image data and automatically switches the display mode based on the extraction result.

The image display apparatus 200 may calculate the backlight control parameter and the image correction parameter based on a result of decoding of the encoded image. Specifically, the emission luminance control unit 108 calculates the backlight control parameter and the image correction parameter based on the display luminance information input from the decoding unit 201. The emission luminance control unit 108 outputs the image correction parameter and the backlight control parameter to the image correction unit 109 and the backlight control unit 110, respectively. Details of a method by which the image display apparatus 200 decodes the input encoded image to obtain the display luminance information, and calculates the backlight control parameter and the image correction parameter based on the obtained information will be described below.

An outline of an operation of the entire image display apparatus 200 will initially be described.

As described above, the image display apparatus 200 has display modes including the normal display mode and the metadata HDR display mode. The image display apparatus 200 also has enlargement modes including an interpolation enlargement mode and a pixel enlargement mode. During interpolation enlargement, the image display apparatus 200 displays an image in the "normal display mode" if the normal display mode is specified, and displays an image in the "metadata HDR display mode" if the metadata HDR display mode is specified. In performing pixel enlargement, the image display apparatus 200 uses a display method different from those of the "normal display mode" and the "metadata HDR display mode" to provide display suitable for a focus check.

More specifically, during pixel enlargement, the image display apparatus 200 displays an image in the "normal display mode" if the normal display mode is specified. If the metadata HDR display mode is specified, the image display apparatus 200 displays an image in a "corrected metadata HDR display mode" in which the image is displayed in an HDR manner corrected by the HDR correction unit 107.

An operation of the HDR correction unit 107 and the emission luminance control unit 108 in each of the "normal display mode", "metadata HDR display mode", and "corrected metadata HDR display mode" will be described below with reference to specific examples.

Details of the encoded image used in the following description will initially be described.

Figure 17:
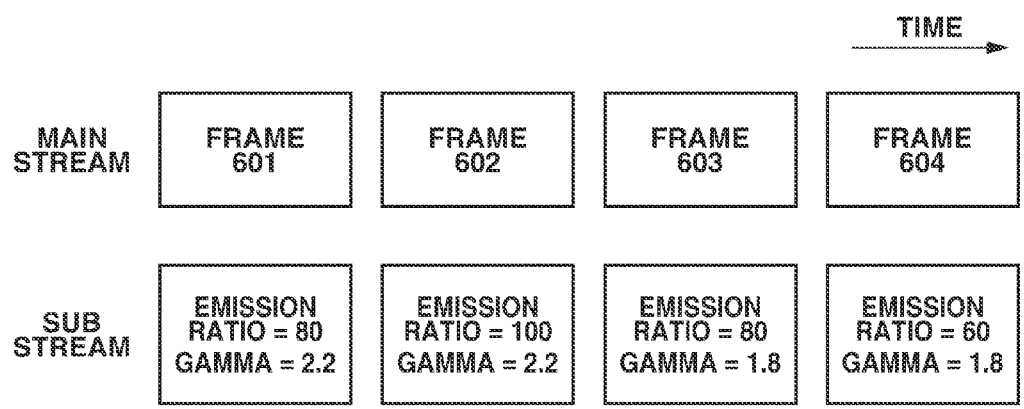
FIG. 17 is a diagram illustrating an example of an encoded image.

FIG. 17 is a diagram illustrating an example of the encoded image. As illustrated in FIG. 17, the encoded image includes two streams. One of the streams included in the encoded image is a main stream which is normal image data. The other is a sub stream in which information about display luminance is stored. The sub stream contains emission ratio information in displaying the input image and an image correction coefficient in providing display according to the emission ratio information. The emission ratio information is a value indicating the ratio of the intensity of the emission luminance with the maximum emission luminance the backlight 112 can output as 100%, and the minimum emission luminance as 0%. The image correction coefficient is a gamma value for correcting the gradation distribution of the image data. If the image data is moving image data, such information is added to each frame of the moving image data.

The sub stream may contain an image luminance value (for example, 100 cd/m$^2$) instead of the emission ratio information. If the image data is moving image data, a piece of emission ratio information may be added not to each frame but to each single pixel in the frame. Only one piece of emission ratio information may be added to a plurality of frames. The image correction coefficient may be a gradation correction LUT for performing gradation correction, instead of a gamma value.

(Normal Display Mode)

An operation of the HDR correction unit 107 and the emission luminance control unit 108 when the encoded image is displayed in the "normal display mode" will initially be described.

In the normal display mode, the emission luminance control unit 108 determines the emission luminance according to the features of the image data without referring to the emission ratio information added to the encoded image. The operation of the emission luminance control unit 108 and that of the HDR correction unit 107 are therefore similar to those in the first exemplary embodiment. A description thereof will thus be omitted.

(Metadata HDR Display Mode)

Next, an operation of the emission luminance control unit 108 and an operation of the HDR correction unit 107 when the encoded image is displayed in the "metadata HDR display mode" will be described.

The decoding unit 201 initially performs decoding processing on the encoded image to extract the emission luminance ratio information and the image correction coefficient illustrated in the sub stream of FIG. 17. The decoding unit 201 outputs the emission luminance ratio information and the image correction coefficient to the emission luminance control unit 108. The emission luminance control unit 108 determines the backlight emission luminance value based on the input emission ratio information. Specifically, the emission luminance control unit 108 calculates a value as backlight emission luminance by multiplying the maximum emission luminance value of the backlight 112 by the input emission ratio information.

Suppose that the backlight 112 according to the present exemplary embodiment has a maximum emission luminance of 5000 cd/m$^2$. In FIG. 17, a frame 601 has emission ratio information of 80%. The emission luminance in displaying the frame 601 is 4000 cd/m$^2$ which is equivalent to 80% of the maximum emission luminance of 5000 cd/m$^2$. If the backlight emission luminance of the backlight 112 can be controlled with respect to each of a plurality of divided regions, all the divided regions may be set at the emission luminance of 4000 cd/m$^2$.

If the sub stream contains an emission luminance value instead of the emission ratio information, the emission luminance control unit 108 simply outputs the emission luminance value obtained by the decoding unit 201.

The emission luminance control unit 108 generates an image correction parameter according to the input image correction coefficient, and outputs the image correction parameter to the image correction unit 109. Specifically, based on the input gamma value, the emission luminance control unit 108 reads and outputs a gamma curve corresponding to the gamma value from the storage unit 113. In such a manner, the display control unit 105 can change the gradation values of the input image to change the gradation distribution and thereby switch the display luminance.

If a gradation correction LUT is input as the image correction coefficient, the emission luminance control unit 108 simply outputs the input gradation correction LUT to the image correction unit 109. Since the backlight emission luminance and the image correction parameter do not need to be corrected in the metadata HDR display mode, the HDR correction unit 107 does not perform processing. The emission luminance control unit 108 may be configured to not refer to the output of the HDR correction unit 107 in the metadata HDR display mode.

The number of pieces of display luminance information that can be extracted from the encoded image is not limited to one.

FIG. 18 is a diagram illustrating another example of the display luminance information that can be extracted from the encoded image. In the example of FIG. 18, one encoded image contains a plurality of pieces of display luminance information 181 and division format information 182. The division format information 182 is intended to extract display luminance information suitable for a backlight division format of the image display apparatus 200 from among the plurality of pieces of display luminance information 181. The division format information 182 associates division formats with types of luminance ratios.

If the display luminance information 181 includes the contents illustrated in FIG. 18, the decoding unit 201 selects and obtains luminance ratio information suitable for the division format of the backlight 112. In the present exemplary embodiment, the emission luminance of the backlight 112 can be controlled with respect to each of two rows and three columns, i.e., six divided regions. The decoding unit 201 then refers to the division format information 182 for extracting display luminance information suitable for the division format of the backlight 112, and selects and outputs optimum display luminance information from among the pieces of display luminance information 181. The emission luminance control unit 108 determines the emission luminance of each divided region of the backlight 112 based on the input emission ratio information about each divided region of the backlight 112.

(Corrected Metadata HDR Display Mode)

Next, an operation of the HDR correction unit 107 and the emission luminance control unit 108 when the encoded image is displayed in the "corrected metadata HDR display mode" will be described.

Like the first exemplary embodiment, if the display mode is the pixel enlargement mode, the HDR correction unit 107 outputs the HDR correction information for switching the control method of the emission luminance control unit 108. In the present exemplary embodiment, the HDR correction unit 107 again transmits the upper and lower limit values of the backlight emission luminance value as the HDR correction information. Suppose that the upper limit value is 500 cd/m² and the lower limit value is 50 cd/m².

Receiving the upper and lower limit values, the emission luminance control unit 108 corrects the backlight emission luminance calculated based on the emission ratio information by using the upper and lower limit values. In the present exemplary embodiment, the backlight emission luminance calculated based on the emission ratio information is 4000 cd/m². Since the backlight emission luminance exceeds the upper limit value output from the HDR correction unit 107, the emission luminance control unit 108 performs limit processing to limit the backlight emission luminance to the upper limit value of 500 cd/m². If the plurality of divided regions of the backlight 112 has respective different emission luminance settings, the limit processing is performed to limit the highest emission luminance to the upper limit value. In the other divided regions, the emission luminance is suppressed by the same ratio. The emission luminance can thus be suppressed without changing the balance of the emission luminance on the entire screen.

Like the first exemplary embodiment, the emission luminance control unit 108 may perform correction processing according to the backlight emission luminance value(s) after the foregoing limit processing. In such a case, the emission luminance control unit 108 performs the correction processing on the input image based on a gradation distribution suitable for each backlight emission luminance value, obtained by experiment in advance.

As described above, the image display apparatus 200 can control the backlight 112 to a predetermined emission luminance value or values even if the encoded image is displayed based on the information about the display luminance, added as metadata to the encoded image. If display luminance too high or too low to be suitable for pixel enlargement display is added as the metadata, the display luminance can be corrected to within a range of emission luminance suitable for pixel enlargement display. As a result, the image display apparatus 200 can prevent the enlargement image from being enlarged and displayed with high luminance. This can reduce the possibility that the user has difficulty in performing a focus check due to glare. The possibility that the user looks closely at or near the region of high luminance and the efficiency of the focus check operation decreases can also be reduced.

The HDR correction information output from the HDR correction unit 107 is not limited to the upper and lower limit values of the backlight emission luminance value. For example, as with the "corrected HDR display mode" according to the first exemplary embodiment, the HDR correction unit 107 may output, as the HDR correction information, control information for switching to a mode in which the emission luminance is controlled based on the feature amount and the HDR correction information, instead of the emission luminance being controlled based on the metadata. In such a case, like the first exemplary embodiment, emission luminance suitable for pixel enlargement display may be measured by experiment and registered as an LUT in the HDR correction unit 107 in advance. The emission luminance control unit 108 determines the backlight emission luminance by referring to the average luminance value of the image data and the LUT registered in advance.

The HDR correction unit 107 may output control information for switching to the normal display mode as the HDR correction information. Since the switching to the normal display mode suppresses the range of emission luminance, the possibilities that the user has difficulty in performing a focus check due to glare and that the user looks closely at or near the pixel enlargement region of high luminance and the efficiency of the focus check operation decreases can be reduced.

[Processing Sequence of Image Display Apparatus 200]

Figure 19:
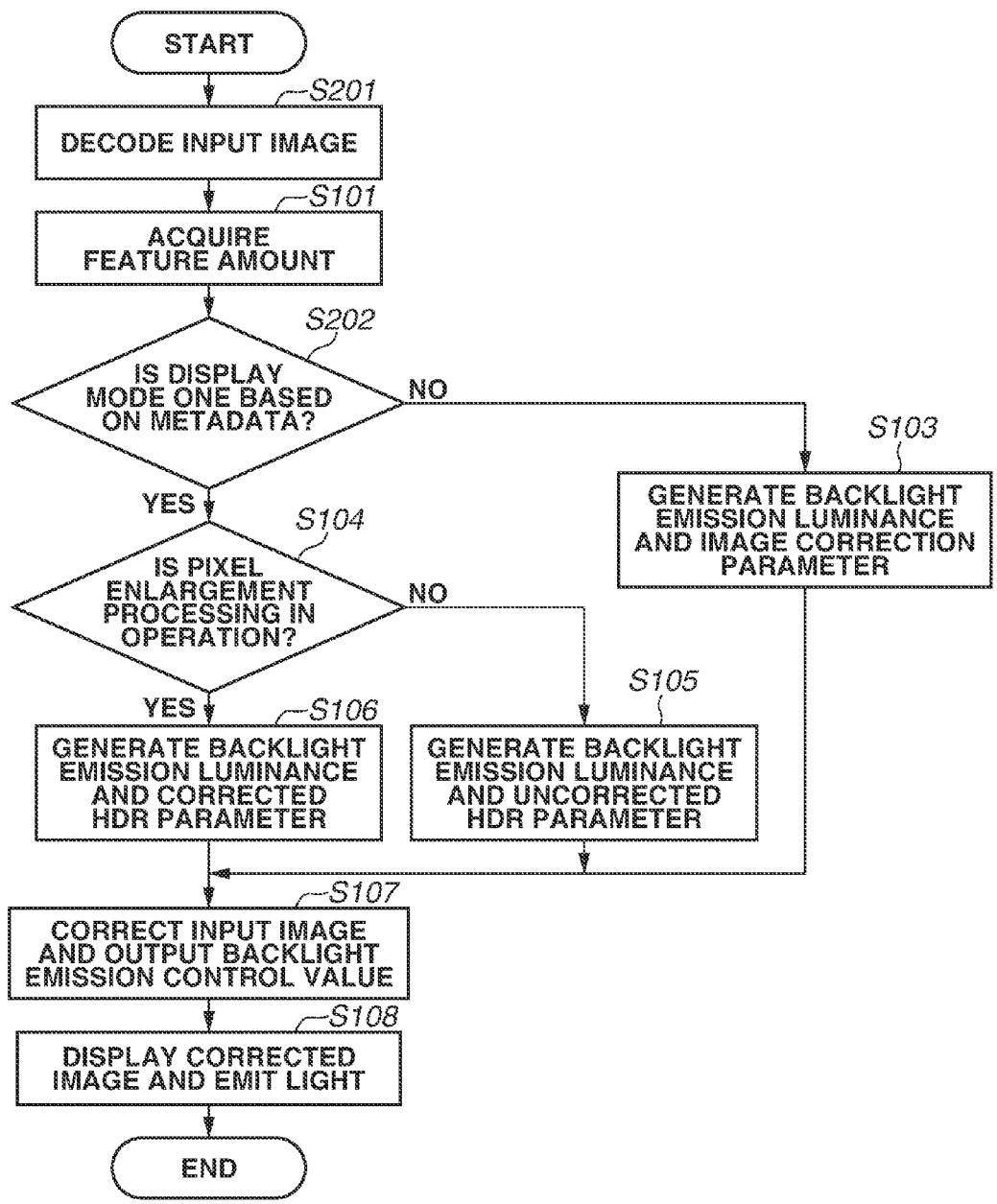
FIG. 19 is a flowchart illustrating a flow of processing performed by the image display apparatus.

FIG. 19 is a flowchart illustrating a flow of processing performed by the image display apparatus 200. The processing flow of the image display apparatus 200 will be described below with reference to FIG. 19.

In step S201, the decoding unit 201 decodes the encoded image input from the image acquisition unit 101. In step S101, the feature amount acquisition unit 106 acquires the feature amount of the image data to which enlargement processing and image processing are applied.

In step S202, the HDR correction unit 107 determines whether the display mode is one based on metadata. If the HDR correction unit 107 determines that the display mode is the normal display mode (NO in step S202), the processing proceeds to step S103. In step S103, the emission luminance control unit 108 generates backlight emission luminance and an image correction parameter by using the LUT for the normal display mode. If the display mode is the metadata HDR display mode (YES in step S202), the processing proceeds to step S104. In step S104, the HDR correction unit 107 switches processing depending on whether the pixel enlargement processing is in operation.

In step S104, if the HDR correction unit 107 determines that the pixel enlargement processing is not in operation (NO in step S104), the processing proceeds to step S105. In step S105, the emission luminance control unit 108 generates backlight emission luminance and an image correction parameter (uncorrected HDR parameter) without correcting the decoded information about the emission luminance. If the HDR correction unit 107 determines that the pixel enlargement processing is in operation (YES in step S104), the processing proceeds to step S106. In step S106, the HDR correction unit 107 outputs the HDR correction information to the emission luminance control unit 108. The emission luminance control unit 108 generates backlight emission luminance and an image correction parameter (corrected HDR parameter) based on the HDR correction information and the LUT.

In step S107, the image correction unit 109 corrects the input image based on the input correction parameter. The backlight control unit 110 outputs a backlight emission control value according to the input parameter. In step S108, the display unit 111 displays the corrected image. The backlight 112 emits light based on the backlight emission control value.

As described above, the image display apparatus 200 according to the present exemplary embodiment can switch the HDR display style between during normal display or interpolation enlargement and during pixel enlargement even if the encoded image is displayed based on the display luminance information added as metadata to the encoded image. As a result, during HDR display with pixel enlargement, the image display apparatus 200 prevents pixel enlargement display with emission luminance at which the user has difficulty in looking closely or with emission luminance at which edges are difficult to observe. This can improve the convenience of a focus check operation during the HDR display.

In the first and second exemplary embodiments, the HDR display style is described to be switched between during normal display or interpolation enlargement and during pixel enlargement. A third exemplary embodiment differs from the first and the second exemplary embodiments in that the HDR display style is switched between during normal display and during peaking processing. The peaking processing refers to processing for displaying an image for enhancing a contour of an object included in the input image on the input image in a superimposed manner.

Figure 20:
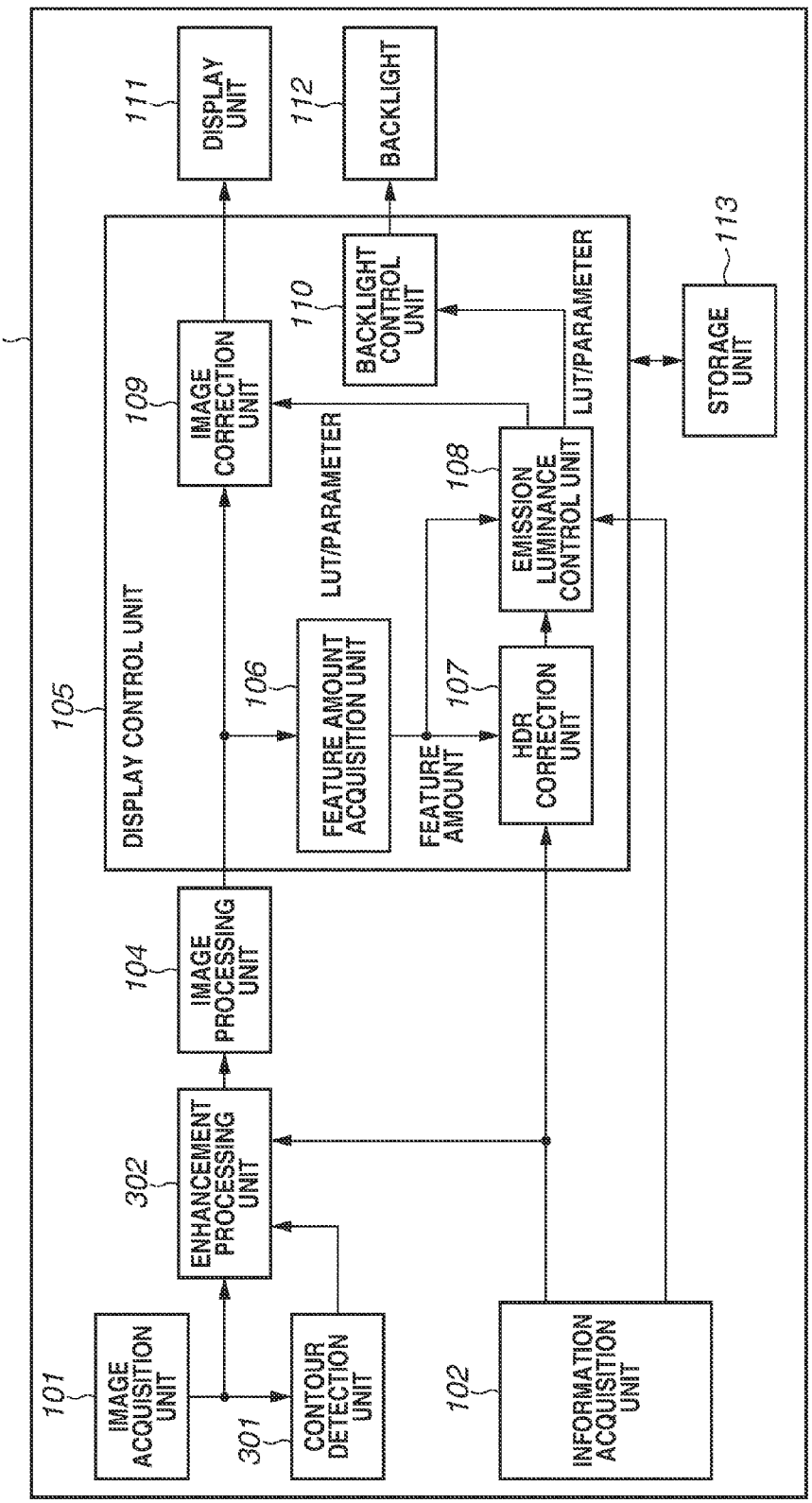
FIG. 20 is a block diagram illustrating a configuration of an image display apparatus according to a third exemplary embodiment.

FIG. 20 is a block diagram illustrating a configuration of an image display apparatus 300 according to the present exemplary embodiment. As illustrated in FIG. 20, the image display apparatus 300 includes a contour detection unit 301 and an enhancement processing unit 302 instead of the enlargement processing unit 103 illustrated in FIG. 1. In FIG. 20, functional units similar to those of the image display apparatus 100 illustrated in FIG. 1 according to the first exemplary embodiment are designated by the same reference numerals. A description thereof will be omitted.

The image acquisition unit 101 of the image display apparatus 300 outputs the acquired input image to the contour detection unit 301 and the enhancement processing unit 302.

The information acquisition unit 102 acquires peaking setting instruction information from the user via a remote controller, a touch panel, or a cursor. The information acquisition unit 102 outputs peaking control information generated based on the peaking setting instruction information to the enhancement processing unit 302 and the HDR correction unit 107. The peaking setting instruction information is contour enhancement information indicating that a display image obtained by enhancing a contour of an object in the input image is displayed on the display unit 111.

A peaking setting does not necessarily need to be specified by the user. For example, if peaking setting information is added as metadata to the image data, the information acquisition unit 102 may extract the metadata from the image data and generate the peaking control information based on the extracted metadata.

The contour detection unit 301 detects contour components in the input image. For example, the contour detection unit 301 can pass the input image data through a band-pass filter and detect contour components based on the image data past the band-pass filter.

The enhancement processing unit 302 applies the peaking processing to the input image based on the peaking control information and the contour components, and outputs the resultant to the image processing unit 104. If no peaking control information is input, the enhancement processing unit 302 outputs the input image without the application of the peaking processing.

The display control unit 105 reduces the display luminance of the display unit 111 if a display image obtained by enhancing the contour of the object in the input image is displayed on the display unit 111. For example, the display control unit 105 switches the display luminance based on whether the information acquisition unit 102 acquires contour enhancement information. Specifically, if the contour is displayed on the display unit 111 without being enhanced, the display control unit 105 displays the display image with first display luminance. If the contour is enhanced and displayed on the display unit 111 based on the contour enhancement information, the display control unit 105 displays the display image with second display luminance lower than the first display luminance.

More specifically, the HDR correction unit 107 receives the peaking control information output from the information acquisition unit 102 and determines whether the peaking setting is enabled, i.e., whether the peaking processing is applied to the image data. Depending on the determination result, the HDR correction unit 107 generates and outputs correction information for correcting the emission luminance control value for the emission luminance control unit 108 to output. The HDR correction unit 107 may obtain the information about the peaking setting not from the output of the information acquisition unit 102 but from the enhancement processing unit 302 or a management unit (not illustrated) for managing the layout of the display screen.

Next, an operation of the entire image display apparatus 300 will be described.

Without the peaking setting being enabled, the image display apparatus 300 displays the image in the "normal display mode" if the normal display mode is specified. The image display apparatus 300 displays the image in the "HDR display mode" if the HDR display mode is specified.

Suppose that the peaking setting is enabled. To provide display suitable for a focus check, the image display apparatus 300 displays the image in the "normal display mode" if the normal display mode is specified. If the HDR display mode is specified, the image display apparatus 300 displays the image in the "corrected HDR display mode" which is an HDR display style corrected by the HDR correction unit 107.

The operation of the HDR correction unit 107 and the emission luminance control unit 108 in each of the "normal display mode", "HDR display mode", and "corrected HDR display mode" according to the present exemplary embodiment is similar to that in the first exemplary embodiment. A description thereof will thus be omitted.

Figure 21:
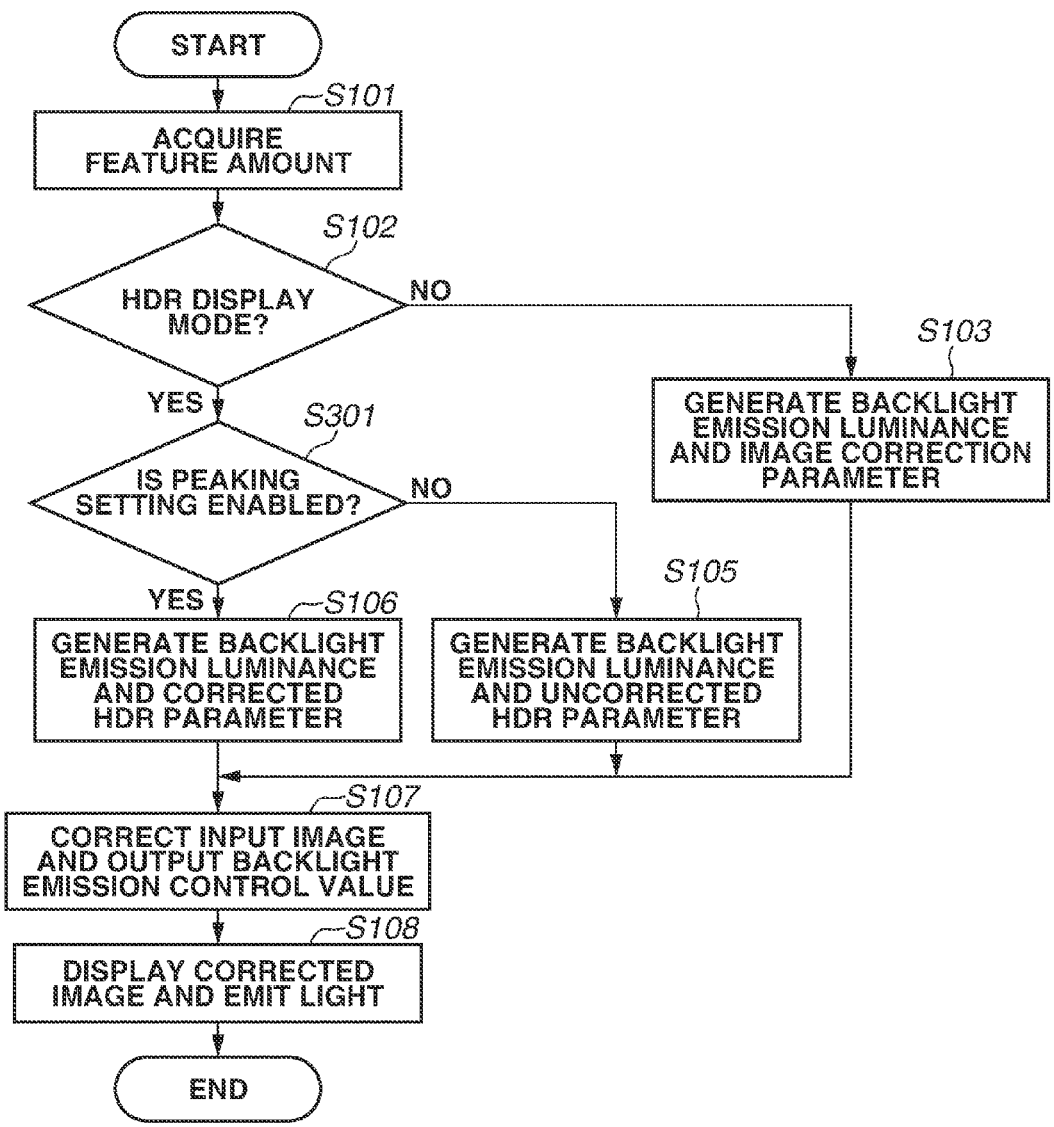
FIG. 21 is a flowchart illustrating an example of an operation of the image display apparatus according to the third exemplary embodiment.

FIG. 21 is a flowchart illustrating an example of an operation of the image display apparatus 300 according to the present exemplary embodiment. A processing flow of the image display apparatus 300 will be described below with reference to the flowchart of FIG. 21.

In step S101, the feature amount acquisition unit 106 acquires the feature amount of the image data output from the image processing unit 104. In step S102, if the display mode is not the HDR display mode but the normal display mode (NO in step S102), the processing proceeds to step S103. In step S103, the emission luminance control unit 108 generates backlight emission luminance and an image correction parameter by using the LUT for the normal display mode. On the other hand, if the display mode is the HDR display mode (YES in step S102), the processing proceeds to step S301. In step S301, the emission luminance control unit 108 switches processing depending on whether the peaking setting is enabled.

If the peaking setting is disabled (NO in step S301), the processing proceeds to step S105. In step S105, the emission luminance control unit 108 generates backlight emission luminance and an image correction parameter (uncorrected HDR parameter) by using the LUT for the HDR display mode. On the other hand, if the peaking setting is enabled (YES in step S301), the processing proceeds to step S106. In step S106, the emission luminance control unit 108 generates backlight emission luminance and an image correction parameter (corrected HDR parameter) based on the HDR correction information output by the HDR correction unit 107 and the LUT.

In step S107, the image correction unit 109 corrects the input image based on the input correction parameter. The backlight control unit 110 outputs a backlight emission control value according to the input parameter. In step S108, the display unit 111 displays the corrected image. The backlight 112 emits light based on the backlight emission control value.

As described above, according to the present exemplary embodiment, the HDR display style can be switched between during normal display and during peaking processing. This prevents image display with emission luminance at which the user has difficulty in looking closely when the peaking setting is enabled during HDR display. The convenience of a focus check operation during HDR display can thus be improved.

In the present exemplary embodiment, an HDR correction is described to be performed on the image to which the peaking processing is applied inside the image display apparatus 300. However, the HDR correction may be performed on an image to which the peaking processing is applied by an external apparatus. Specifically, the image display apparatus 300 receives peaking control information indicating the presence or absence of the peaking processing from the external apparatus. The HDR correction unit 107 switches the control method of the emission luminance control unit 108 according to the peaking control information, and thereby makes an HDR correction. The image display apparatus 300 may obtain the peaking control information through a system different from that of the image data. The image display apparatus 300 may extract peaking control information superposed on the image data.

Similar to the first exemplary embodiment, the HDR correction information output from the HDR correction unit 107 is not limited to the upper and lower limit values of the backlight emission luminance value. For example, image correction parameters and backlight emission luminance values at which luminance and gradation characteristics suitable for a focus check are obtained may be measured by experiment and registered as an LUT in the HDR correction unit 107 in advance.

In the present exemplary embodiment, an HDR correction is described to be always performed according to the peaking processing if the display mode is the HDR display mode. However, the image display apparatus 300 may have an HDR forced mode in which the image display apparatus 300 operates to maintain the HDR display without a HDR correction even if the peaking processing is in operation.

The image acquisition unit 101 may function as a determination unit for determining whether the input image includes a contour enhancement image for enhancing a contour of an object. The information acquisition unit 102 may acquire, as the contour enhancement information, the result of determination of the image acquisition unit 101 serving as the determination unit that the input image includes a contour enhancement image. In such a manner, the image display apparatus 300 can automatically reduce the display luminance if an input image on which an edge peaking image is superimposed is obtained without the user making the peaking setting.

In the third exemplary embodiment, the HDR display style is described to be switched between during normal display and during peaking processing.

A fourth exemplary embodiment describes an operation of displaying an image based on the display luminance information added as metadata during normal display and during peaking processing. If the information acquisition unit 102 does not acquire contour enhancement information, the display control unit 105 determines the display luminance of the display unit 111 based on the display luminance information. If the information acquisition unit 102 acquires contour enhancement information, the display control unit 105 determines the display luminance of the display unit 111 without taking into account the display luminance information.

Figure 22:
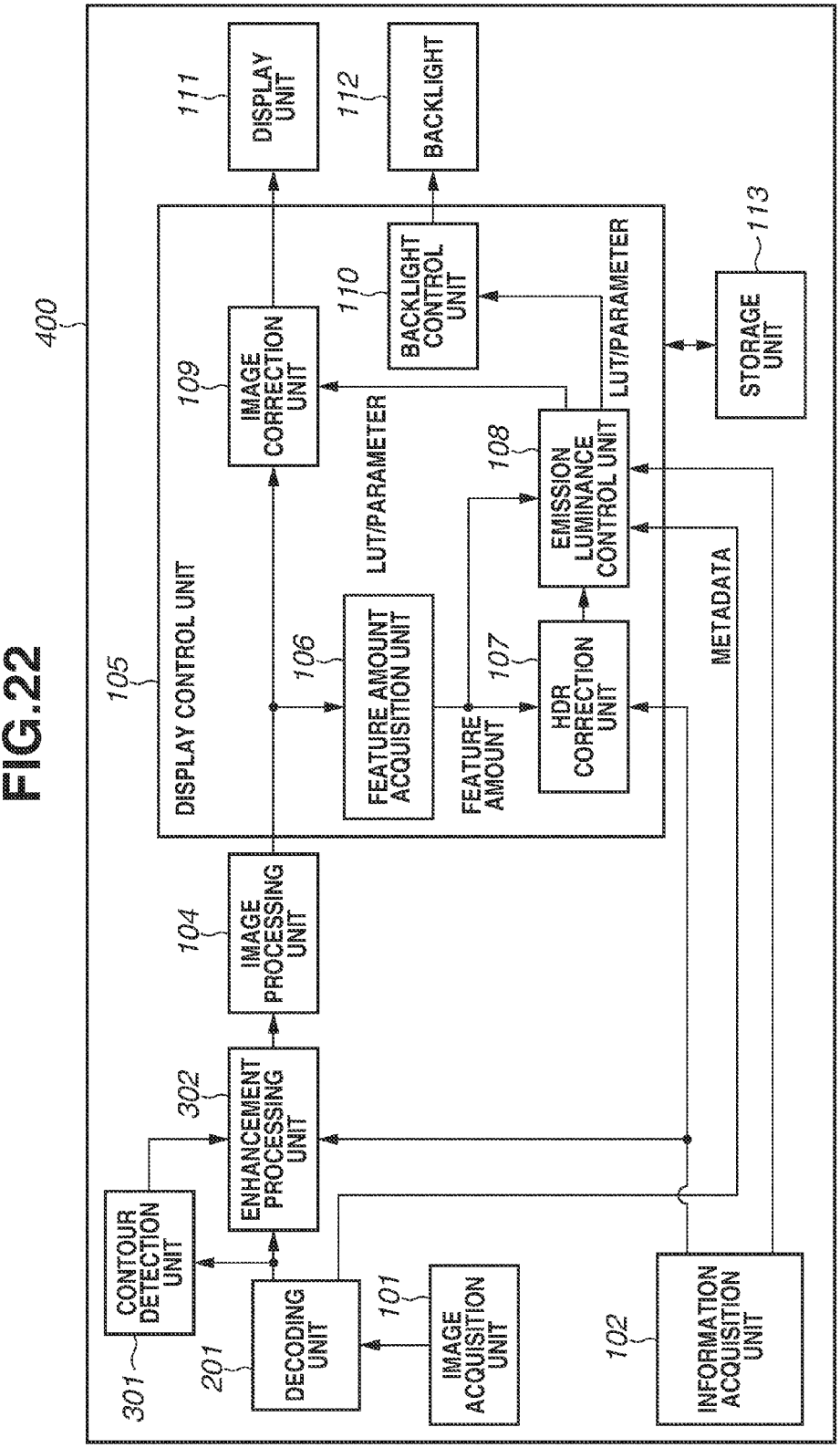
FIG. 22 is a block diagram illustrating a configuration of an image display apparatus according to a fourth exemplary embodiment.

FIG. 22 is a block diagram illustrating a configuration of an image display apparatus 400 according to the present exemplary embodiment. As illustrated in FIG. 22, the image display apparatus 400 includes the contour detection unit 301 and the enhancement processing unit 302 instead of the enlargement processing unit 103 in the image display apparatus 200 illustrated in FIG. 16.

In FIG. 22, functional units similar to those illustrated in FIG. 1 according to the first exemplary embodiment, FIG. 16 according to the second exemplary embodiment, and FIG. 20 according to the third exemplary embodiment are designated by the same respective reference numerals. A description thereof will be omitted.

The decoding unit 201 decodes the encoded image input from the image acquisition unit 101. The decoding unit 201 outputs the decoded image data to the contour detection unit 301 and the enhancement processing unit 302, and outputs metadata information about the display luminance to the emission luminance control unit 108.

An outline of an operation of the entire image display apparatus 400 will be described.

Without the peaking setting being enabled, the image display apparatus 400 displays the image in the "normal display mode" if the normal display mode is specified. The image display apparatus 400 displays the image in the "metadata HDR display mode" if the metadata HDR display mode is specified.

Suppose that the peaking setting is enabled. If the normal display mode is specified, the image display apparatus 400 displays the image in the "normal display mode". If the metadata HDR display mode is specified, the image display apparatus 400 displays the image in the "corrected metadata HDR display mode", which is an HDR display style corrected by the HDR correction unit 107, to provide display suitable for a focus check.

The operation of the HDR correction unit 107 and the emission luminance control unit 108 in each of the "normal display mode", "metadata HDR display mode", and "corrected metadata HDR display mode" according to the present exemplary embodiment is similar to that in the second exemplary embodiment. A description thereof will thus be omitted.

FIG. 23 is a flowchart illustrating an example of an operation of the image display apparatus 400 according to the present exemplary embodiment. A processing sequence of the image display apparatus 400 will be described below with reference to the flowchart of FIG. 23.

In step S201, the decoding unit 201 decodes the encoded image input from the image acquisition unit 101. In step S101, the feature amount acquisition unit 106 acquires the feature amount of the image data output from the image processing unit 104.

In step S202, if the display mode is the normal display mode, not one in which an image is displayed based on metadata (NO in step S202), the processing proceeds to step S103. In step S103, the emission luminance control unit 108 generates backlight emission luminance and an image correction parameter by using the LUT for the normal display mode. If the display mode is the metadata HDR display mode (YES in step S202), the processing proceeds to step S301. In step S301, the emission luminance control unit 108 switches processing depending on whether the peaking setting is enabled.

If the peaking setting is disabled (NO in step S301), the processing proceeds to step S105. In step S105, the emission luminance control unit 108 generates backlight emission luminance and an image correction parameter based on the decoded information about the emission luminance. On the other hand, if the peaking setting is enabled (YES in step S301), the processing proceeds to step S106. In step S106, the emission luminance control unit 108 generates backlight emission luminance and an image correction parameter based on the HDR correction information output by the HDR correction unit 107 and the LUT.

In step S107, the image correction unit 109 corrects the input image based on the input correction parameter. The backlight control unit 110 outputs a backlight emission control value according to the input parameter. In step S108, the display unit 111 displays the corrected image. The backlight 112 emits light based on the backlight emission control value.

As described above, according to the present exemplary embodiment, the HDR display style can be switched between during normal display and during peaking processing even if the encoded image is displayed based on the display luminance information added as metadata to the encoded image. This prevents pixel enlargement display with emission luminance at which the user has difficulty in looking closely when the peaking setting is enabled during HDR display. The convenience of a focus check operation during the HDR display can be improved.

A fifth exemplary embodiment will be described below. The image acquisition unit 101, the information acquisition unit 102, the enlargement processing unit 103, the image processing unit 104, the display control unit 105 (the feature amount acquisition unit 106, the HDR correction unit 107, the emission luminance control unit 108, the image correction unit 109, and the backlight control unit 110), the decoding unit 201, the contour detection unit 301, and the enhancement processing unit 302 according to the foregoing first to fourth exemplary embodiments may be implemented by a computer (CPU) executing an image display program stored in a storage medium.

While the exemplary embodiments of the present invention have been described above, the technical scope of the present invention is not limited to that described in the foregoing exemplary embodiments. Various changes and modifications may be made without departing from the gist thereof.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-079105, filed Apr. 11, 2016, which is hereby incorporated by reference herein in its entirety.

What is claimed is:
1. An image display apparatus comprising:
  a display panel configured to display a display image thereon;
  an image acquisition interface configured to acquire an input image to be displayed on the display panel; and
  a display controller configured to control display luminance of the display panel, wherein, in a case where the input image is a HDR (high dynamic range) image, the display controller displays
  a) the display image with first display luminance if the display image is obtained without enlarging the input image,
  b) the display image with second display luminance that is lower than the first display luminance if the display image is obtained by enlarging a part of the input image by using a pixel enlargement method, and
  c) the display image with the first display luminance if the display image is obtained by enlarging the part of the input image by using an interpolation enlargement method,
  wherein the pixel enlargement method is a method for generating an enlarged image by duplicating a pixel near an interpolated pixel, and wherein the interpolation enlargement method is a method for generating an enlarged image by performing interpolation calculation based on one or more pixels near an interpolated pixel.
2. The image display apparatus according to claim 1, wherein the display controller is configured to display the display image so that a region including an image obtained by enlarging the input image is displayed with the second display luminance.

3. The image display apparatus according to claim 1, wherein the display controller is configured to set the second display luminance as luminance for displaying a range narrower than a range displayed with the first display luminance.

4. The image display apparatus according to claim 3, further comprising a detector configured to detect an intensity of external light,
 wherein the display controller is configured to determine the range displayed with the second display luminance based on the intensity of the external light detected by the detector.

5. The image display apparatus according to claim 1, wherein the display controller is configured to switch the display luminance by changing a gradation value of the input image.

6. The image display apparatus according to claim 1, further comprising a backlight configured to emit light to the display panel,
 wherein the display controller is configured to switch the display luminance by changing emission luminance of the light emitted by the backlight.

7. The image display apparatus according to claim 6, wherein the display controller is configured to switch the display luminance by changing a gradation value of the input image based on the emission luminance.

8. The image display apparatus according to claim 1, wherein the display controller is configured to change, in a case where image luminance of the input image changes, the display luminance at a speed lower than a speed at which the image luminance changes.

9. The image display apparatus according to claim 1, wherein the display controller is configured to make a frequency of change of the display luminance lower than a predetermined frequency.

10. The image display apparatus according to claim 1, wherein the display controller is configured to determine the display luminance of the display panel based on display luminance information added to the input image.

11. An image display method executed by a computer, the image display method comprising:
 acquiring an input image to be displayed on a display panel configured to display a display image thereon; and
 controlling display luminance of the display panel, wherein, in a case where the input image is a HDR (high dynamic range) image, controlling display comprises displaying
  a) the display image with first display luminance if the display image is obtained without enlarging the input image,
  b) the display image with second display luminance that is lower than the first display luminance if the display image is obtained by enlarging a part of the input image by using a pixel enlargement method, and
  c) the display image with the first display luminance if the display image is obtained by enlarging the part of the input image by using an interpolation enlargement method,
 wherein the pixel enlargement method is a method for generating an enlarged image by duplicating a pixel near an interpolated pixel, and wherein the interpolation enlargement method is a method for generating an enlarged image by performing interpolation calculation based on one or more pixels near an interpolated pixel.

12. A non-transitory computer-readable having executable programming instructions stored thereon that, when executed, implement the image display method of claim 11.

* * * * *